United States Patent
Karczewicz et al.

(10) Patent No.: US 10,638,126 B2
(45) Date of Patent: Apr. 28, 2020

(54) INTRA REFERENCE FILTER FOR VIDEO CODING

(71) Applicant: QUALCOMM Incorporated, San Diego, CA (US)

(72) Inventors: Marta Karczewicz, San Diego, CA (US); Xin Zhao, San Diego, CA (US); Vadim Seregin, San Diego, CA (US); Amir Said, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 15/969,294

(22) Filed: May 2, 2018

(65) Prior Publication Data

US 2018/0324417 A1 Nov. 8, 2018

Related U.S. Application Data

(60) Provisional application No. 62/502,490, filed on May 5, 2017, provisional application No. 62/559,127, filed on Sep. 15, 2017.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/117* (2014.11); *H04N 19/132* (2014.11);
(Continued)

(58) Field of Classification Search
CPC .... H04N 19/14; H04N 19/159; H04N 19/186; H04N 19/92; H04N 19/597;
(Continued)

(56) References Cited

U.S. PATENT DOCUMENTS

| 2012/0294357 A1* | 11/2012 | Lainema | H04N 19/159 |
| | | | 375/240.12 |
| 2013/0003832 A1* | 1/2013 | Li | H04N 19/105 |
| | | | 375/240.12 |

(Continued)

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union, Apr. 2015, 634 pp.

(Continued)

*Primary Examiner* — Anand S Rao
(74) *Attorney, Agent, or Firm* — Shumaker & Sieffert, P.A.

(57) ABSTRACT

A method of decoding video data that includes receiving a current block of video data encoded using an intra prediction mode, determining residual video data for the current block of video data, determining reference samples of the current block of video data, determining filter coefficients for a bilateral filter based on a distance between the reference samples and neighboring reference samples and based on a sample value difference between the reference samples and the neighboring reference samples, applying the bilateral filter with the determined filter coefficients to the determined reference samples to produce filtered reference samples, generating a prediction block using the filtered reference samples, and adding samples of the prediction block to the determined residual video data to produce a decoded block of video data.

30 Claims, 13 Drawing Sheets

(51) Int. Cl.
 *H04N 19/176* (2014.01)
 *H04N 19/82* (2014.01)
 *H04N 19/159* (2014.01)
 *H04N 19/117* (2014.01)
 *H04N 19/80* (2014.01)
 *H04N 19/593* (2014.01)

(52) U.S. Cl.
 CPC ......... *H04N 19/159* (2014.11); *H04N 19/176* (2014.11); *H04N 19/593* (2014.11); *H04N 19/80* (2014.11); *H04N 19/82* (2014.11)

(58) Field of Classification Search
 CPC .... H04N 19/513; H04N 19/523; H04N 19/52; H04N 19/117; H04N 19/176; H04N 19/521; H04N 19/82
 USPC .......................................... 375/240.11–240.29
 See application file for complete search history.

(56) References Cited

U.S. PATENT DOCUMENTS

| | | | |
|---|---|---|---|
| 2015/0172715 A1* | 6/2015 | Shimizu | H04N 19/597 375/240.16 |
| 2017/0094285 A1 | 3/2017 | Said et al. | |
| 2018/0220130 A1* | 8/2018 | Zhang | H04N 19/117 |

OTHER PUBLICATIONS

Mangold, S. et al., "IEEE 802.11e Wireless LAN for Quality of Service," ComNets TWTH Aachen Univ. of Technology, D-52074 Aachen-Germany, accessed on Jun. 21, 2018, 8 pp.

Ergen, S., "Zig/Bee/IEEE 802.15.4 Summary," Sep. 10, 2004, 37 pp.

Wang et al, "High Efficiency Video Coding (HEVC) Defect Report," Document: JCTVC-N1003_v1, Joint Collaborative Team on Video Coding (JCT-VC) of ITU-T SG 16 WP 3 and ISO/IEC JTC1/SC29/WG11, 14th Meeting, Vienna, AT, Jul. 25-Aug. 2, 2013, 311 pp.

Segall, A. et al., "Draft Joint Call for Proposals on Video Compression with Capability beyond HEVC," Joint Video Exploration Team (JVET) of ITU-T SG 16 WP 3 and ISO/IEC JTC1/SC29/WG11, 7th Meeting: Torino, IT, Jul. 13-21, JVET-G1002, 28 pp.

Panusopone, K. et al., "Unequal Weight Planar Prediction and Constrained PDPC," Joint Video Exploration Team (JVET) of ITU-T SG 16 WP 3 and ISO/IEC JTC1/SC29/WG11, 5th Meeting: Geneva, CH, Jan. 12-20, 2017, JVET-E0068-r1, 6 pp.

Zhao, X. et al., "EE1: Improvements on non-separable secondary transform," Joint Video Exploration Team (JVET) of ITU-T SG 16 WP 3 and ISO/IEC JTC1/SC29/WG11, 4th Meeting: Chengdu, CN, Oct. 15-21, 2016, JVET-D0120, 5 pp.

Tomasi, C. et al., "Bilateral Filtering for Gray and Color Images," Proceedings of the 1998 IEEE International Conference on Computer Vision, Bombay, India, Jan. 1998, 8 pp.

Buades, A. et al., "A non-local algorithm for image denoising," In: Proc. IEEE CVPR, vol. 2, 2005, 6 pp.

Panusopone, K. et al., "Weighted Angular Prediction," Joint Video Exploration Team (JVET) of ITU-T SG16 WP3 and ISO/IEC JTC1/SC29/WG11, 6th Meeting: Hobart, AU, Mar. 3-Apr. 7, 2017, JVET-F0104, 4 pp.

J. An et al., "Block partitioning structure for next generation video coding," International Telecommunication Union, COM16-C966, Oct. 2015, 7 pp.

Chen H., et al., "Nearest-Neighbor Intra Prediction for Screen Content Video Coding," 2014 IEEE International Conference on Image Processing (ICIP) 2014, Oct. 27, 2014 (Oct. 27, 2014), XP032967158, pp. 3151-3155, DOI: 10.11 09/ICIP.2014/025637 [retrieved on Jan. 28, 2015].

Chen J., et al., "Algorithm Description of Joint Exploration Test Model 4 (JEM4)," 116. MPEG Meeting; Oct. 17, 2016-Oct. 21, 2016; Chengdu, CN (Motion Picture Expert Group or ISO/IEC JTC1/SC29/WG11), No. N16511, Nov. 21, 2016 (Nov. 21, 2016), XP030023183, 39 pages.

Chen Y., et al., "Description of SDR, HDR and 360 degree video coding technology proposal by Qualcomm and Technicolor-low and high complexity versions," JVET-J0021, 10th Meeting; San Diego, US, Apr. 10-20, 2018 (The Joint Video Exploration Team of ISO/IEC JTC1/SC29/WG11 and ITU-T SG.16); URL: http://phenix.int-evry.fr/jvet/, pp. 1-43.

International Search Report and Written Opinion—PCT/US2018/030912—ISA/EPO—dated Aug. 24, 2018, 18 pp.

* cited by examiner $$p_{xy} = (\,(y1*H*(W-x1))\cdot L + (x1*W*(H-y1))\cdot T$$
$$+ (x1*y1*H)\cdot R + (x1*y1*W)\cdot B\,) / (W*H*(x1+y1))$$

INTRA REFERENCE FILTER FOR VIDEO CODING

This application claims the benefit of U.S. Provisional Patent Application 62/502,490, filed May 5, 2017, and U.S. Provisional Patent Application 62/559,127, filed Sep. 15, 2017 the entire content of each of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC) standard, and extensions of such standards. The video devices may transmit, receive, encode, decode, and/or store digital video information more efficiently by implementing such video compression techniques.

Video compression techniques may perform spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, such as coding tree blocks and coding blocks. Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized.

SUMMARY

In general, this disclosure describes techniques related to intra prediction and intra mode coding. The techniques of this disclosure may be used in the context of advanced video codecs, such as extensions of HEVC or the next generation of video coding standards. In various examples, this disclosure describes techniques for applying a bilateral filter for mode-dependent intra smoothing (MDIS) or intra reference sample smoothing.

In one example, this disclosure describes a method including receiving a current block of video data encoded using an intra prediction mode, determining residual video data for the current block of video data, determining reference samples of the current block of video data, determining filter coefficients for a bilateral filter based on a distance between the reference samples and neighboring reference samples and based on a sample value difference between the reference samples and the neighboring reference samples, applying the bilateral filter with the determined filter coefficients to the determined reference samples to produce filtered reference samples, generating a prediction block using the filtered reference samples, and adding samples of the prediction block to the determined residual video data to produce a decoded block of video data.

In another example, this disclosure describes a method of encoding video data including receiving a current block of video data, determining an intra prediction mode for the current block of video data, determining reference samples of the current block of video data based on the determined intra prediction mode, determining filter coefficients for a bilateral filter based on a distance between the reference samples and neighboring reference samples and based on a sample value difference between the reference samples and the neighboring reference samples, applying the bilateral filter with the determined filter coefficients to the determined reference samples to produce filtered reference samples, generating a prediction block using the filtered reference samples, generating residual video data from samples of the current block of video data and from samples of the prediction block, and encoding the residual video data as an encoded block of video data.

In another example, this disclosure describes an apparatus configured to decode video data, the apparatus including a memory configured to store a current block of video data, and one or more processors in communication with the memory, the one or more processors configured to receive the current block of video data encoded using an intra prediction mode, determine residual video data for the current block of video data, determine reference samples of the current block of video data, determine filter coefficients for a bilateral filter based on a distance between the reference samples and neighboring reference samples and based on a sample value difference between the reference samples and the neighboring reference samples, apply the bilateral filter with the determined filter coefficients to the determined reference samples to produce filtered reference samples, generate a prediction block using the filtered reference samples, and add samples of the prediction block to the determined residual video data to produce a decoded block of video data.

In another example, this disclosure describes an apparatus configured to encode video data, the apparatus including a memory configured to store a current block of video data, and one or more processors in communication with the memory, the one or more processors configured to receive the current block of video data, determine an intra prediction mode for the current block of video data, determine reference samples of the current block of video data based on the determined intra prediction mode, determine filter coefficients for a bilateral filter based on a distance between the reference samples and neighboring reference samples and based on a sample value difference between the reference samples and the neighboring reference samples, apply the bilateral filter with the determined filter coefficients to the determined reference samples to produce filtered reference samples, generate a prediction block using the filtered reference samples, generate residual video data from samples of the current block of video data and from samples of the prediction block, and encode the residual video data as an encoded block of video data.

In another example, this disclosure describes an apparatus configured to decode video data, the apparatus including means for receiving a current block of video data encoded using an intra prediction mode, means for determining residual video data for the current block of video data, means for determining reference samples of the current block of video data, means for determining filter coefficients for a bilateral filter based on a distance between the reference samples and neighboring reference samples and based on a sample value difference between the reference samples and the neighboring reference samples, means for applying the bilateral filter with the determined filter coefficients to the determined reference samples to produce filtered reference samples, means for generating a prediction block using the filtered reference samples, and means for adding samples of the prediction block to the determined residual video data to produce a decoded block of video data.

In another example, this disclosure describes an apparatus configured to encode video data, the apparatus including means for receiving a current block of video data, means for determining an intra prediction mode for the current block of video data, means for determining reference samples of the current block of video data based on the determined intra prediction mode, means for determining filter coefficients for a bilateral filter based on a distance between the reference samples and neighboring reference samples and based on a sample value difference between the reference samples and the neighboring reference samples, means for applying the bilateral filter with the determined filter coefficients to the determined reference samples to produce filtered reference samples, means for generating a prediction block using the filtered reference samples, means for generating residual video data from samples of the current block of video data and from samples of the prediction block, and means for encoding the residual video data as an encoded block of video data.

In another example, this disclosure describes a non-transitory computer-readable storage medium storing instructions that, when executed, causes one or more processors of a device configured to decode video data to receive the current block of video data encoded using an intra prediction mode, determine residual video data for the current block of video data, determine reference samples of the current block of video data, determine filter coefficients for a bilateral filter based on a distance between the reference samples and neighboring reference samples and based on a sample value difference between the reference samples and the neighboring reference samples, apply the bilateral filter with the determined filter coefficients to the determined reference samples to produce filtered reference samples, generate a prediction block using the filtered reference samples, and add samples of the prediction block to the determined residual video data to produce a decoded block of video data.

In another example, this disclosure describes a non-transitory computer-readable storage medium storing instructions that, when executed, causes one or more processors of a device configured to encode video data to receive the current block of video data, determine an intra prediction mode for the current block of video data, determine reference samples of the current block of video data based on the determined intra prediction mode, determine filter coefficients for a bilateral filter based on a distance between the reference samples and neighboring reference samples and based on a sample value difference between the reference samples and the neighboring reference samples, apply the bilateral filter with the determined filter coefficients to the determined reference samples to produce filtered reference samples, generate a prediction block using the filtered reference samples, generate residual video data from samples of the current block of video data and from samples of the prediction block, and encode the residual video data as an encoded block of video data.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

This disclosure is related to intra prediction and the use of intra reference sample filtering in video coding (e.g., video encoding and/or video decoding). In HEVC and the Joint Exploratory Model (JEM), which is the test software being studied by the Joint Video Experts Team (WET), an intra reference sample can be smoothed (e.g., a filter may be applied). In HEVC, mode dependent intra smoothing (MDIS) is used in a way that a filter is applied to an intra reference sample (e.g., neighbor samples relative to a currently coded block/sample) before generating intra prediction from the intra reference.

In some examples, including image regions with rich slanting texture patterns, some intra reference smoothing filters may reduce the compression efficiency of intra prediction along sharp edges. In addition, for some planar intra prediction modes for non-square blocks, the application of some intra reference smoothing filters results in an undesirable level of compression performance. This disclosure describes techniques for determining filter coefficients for an intra reference sample smoothing filter that may result in improved compression performance. In one example, this disclosure describes techniques for determining filter coefficients for a bilateral filter that may be used for intra reference sample smoothing. In one example, a video coder (e.g., video encoder and/or video decoder) may determine filter coefficients for a bilateral filter based on a distance between the reference samples and neighboring reference samples and based on a sample value difference between the reference samples and the neighboring reference samples.

Figure 1:
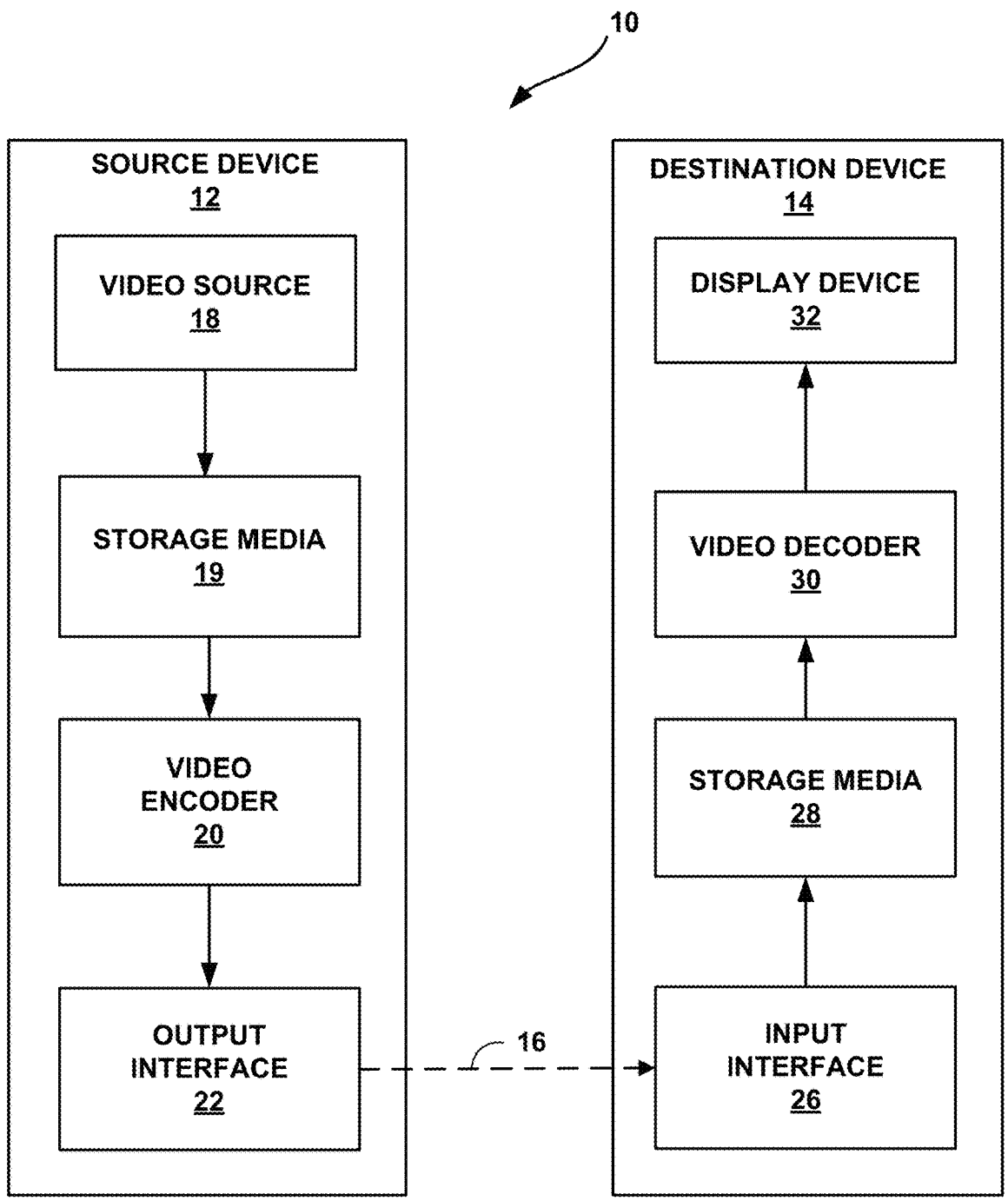
FIG. 1 is a block diagram illustrating an example video encoding and decoding system that may use one or more techniques described in this disclosure.

FIG. 1 is a block diagram illustrating an example video encoding and decoding system 10 that may utilize techniques of this disclosure for intra reference filtering. As shown in FIG. 1, system 10 includes a source device 12 that provides encoded video data to be decoded at a later time by a destination device 14. In particular, source device 12 provides the encoded video data to destination device 14 via a computer-readable medium 16. Source device 12 and destination device 14 may be or include any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 12 and destination device 14 are equipped for wireless communication. Thus, source device 12 and/or destination device 14 may be wireless communication devices. The techniques described in this disclosure may be applied to wireless and/or wired applications. Source device 12 is an example video encoding device (i.e., a device for encoding video data). Destination device 14 is an example video decoding device (i.e., a device for decoding video data).

The illustrated system 10 of FIG. 1 is merely one example. Techniques for processing video data, including performing intra reference filtering, may be performed by any digital video encoding and/or decoding device. In some examples, the techniques may be performed by a video encoder/decoder, typically referred to as a "CODEC." Source device 12 and destination device 14 are examples of such coding devices in which source device 12 generates coded video data for transmission to destination device 14. In some examples, source device 12 and destination device 14 operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

In the example of FIG. 1, source device 12 includes a video source 18, storage media 19 configured to store video data, a video encoder 20, and an output interface 22. Destination device 14 includes an input interface 26, storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

Video source 18 is a source of video data. The video data may include a series of pictures. Video source 18 may include a video capture device, such as a video camera, a video archive containing previously captured video, and/or a video feed interface to receive video data from a video content provider. In some examples, video source 18 generates computer graphics-based video data, or a combination of live video, archived video, and computer-generated video. Storage media 19 may be configured to store the video data. In each case, the captured, pre-captured, or computer-generated video may be encoded by video encoder 20.

Output interface 22 may output the encoded video information to a computer-readable medium 16. Output interface 22 may include various types of components or devices. For example, output interface 22 may include a wireless transmitter, a modem, a wired networking component (e.g., an Ethernet card), or another physical component. In examples where output interface 22 includes a wireless transmitter, output interface 22 may be configured to transmit data, such as encoded video data, modulated according to a cellular communication standard, such as 4G, 4G-LTE, LTE Advanced, 5G, and the like. In some examples where output interface 22 includes a wireless transmitter, output interface 22 may be configured to transmit data, such as encoded video data, modulated according to other wireless standards, such as an IEEE 802.11 specification, an IEEE 802.15 specification (e.g., ZigBee™), a Bluetooth™ standard, and the like. In some examples, circuitry of output interface 22 is integrated into circuitry of video encoder 20 and/or other components of source device 12. For example, video encoder 20 and output interface 22 may be parts of a system on a chip (SoC). The SoC may also include other components, such as a general-purpose microprocessor, a graphics processing unit, and so on.

Destination device 14 may receive encoded video data to be decoded via computer-readable medium 16. Computer-readable medium 16 may include any type of medium or device capable of moving the encoded video data from source device 12 to destination device 14. In some examples, computer-readable medium 16 includes a communication medium to enable source device 12 to transmit encoded video data directly to destination device 14 in real-time. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may include one or more data storage media configured to store encoded video data and decoded video data.

In some examples, output interface 22 may output data, such as encoded video data, to an intermediate device, such as a storage device. Similarly, input interface 26 of destination device 14 may receive encoded data from the intermediate device. The intermediate device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In some examples, the intermediate device corresponds to a file server. Example file servers include web servers, FTP servers, network attached storage (NAS) devices, or local disk drives.

Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives data from computer-readable medium 16. Input interface 26 may include various types of components or devices. For example, input interface 26 may include a wireless receiver, a modem, a wired networking component (e.g., an Ethernet card), or another physical component. In examples where input interface 26 includes a wireless receiver, input interface 26 may be configured to receive data, such as the bitstream, modulated according to a cellular communication standard, such as 4G, 4G-LTE, LTE Advanced, 5G, and the like. In some examples where input interface 26 includes a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general-purpose microprocessor, a graphics processing unit, and so on.

Storage media 28 may be configured to store encoded video data, such as encoded video data (e.g., a bitstream) received by input interface 26. Display device 32 displays the decoded video data to a user. Display device 32 may include any of a variety of display devices such as a cathode ray tube (CRT), a liquid crystal display (LCD), a plasma display, an organic light emitting diode (OLED) display, or another type of display device.

Video encoder 20 and video decoder unit 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 encode and decode video data according to a video coding standard or specification. For example, video encoder 20 and video decoder 30 may encode and decode video data according to ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions, or another video coding standard or specification. In some examples, video encoder 20 and video decoder 30 encode and decode video data according to the High Efficiency Video Coding (HEVC) standard, which as known as or ITU-T H.265, its range and screen content coding extensions, its 3D video coding extension (3D-HEVC), its multiview extension (MV-HEVC), or its scalable extension (SHVC). A draft of the HEVC specification, referred to as HEVC WD hereinafter, is available from http://phenix.int-evry.fr/jct/doc_end_user/documents/14_Vienna/wg11/JCTVC-N1003-v1.zip.

This disclosure may generally refer to "signaling" certain information, such as syntax elements. The term "signaling" may generally refer to the communication of syntax elements and/or other data used to decode the encoded video data. Such communication may occur in real- or near-real-time. Alternately, such communication may occur over a span of time, such as might occur when storing syntax elements to a computer-readable storage medium in a bitstream at the time of encoding, which then may be retrieved by a decoding device at any time after being stored to this medium.

In HEVC and other video coding specifications, video data includes a series of pictures. Pictures may also be referred to as "frames." A picture may include one or more sample arrays. Each respective sample array of a picture may include an array of samples for a respective color component. A picture may include three sample arrays, denoted $S_L$, $S_{Cb}$, and $S_{Cr}$. $S_L$ is a two-dimensional array (i.e., a block) of luma samples. So is a two-dimensional array of Cb chroma samples. $S_{Cr}$ is a two-dimensional array of Cr chroma samples. In other instances, a picture may be monochrome and may only include an array of luma samples. As used in this disclosure, a sample may generally refer to any of a luma sample (Y), a red chroma sample (Cr), a blue chroma sample (Cb), or any other type of color component of a pixel.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. In some examples, to encode a block of the picture, video encoder 20 performs intra prediction or inter prediction to generate one or more predictive blocks. Additionally, video encoder 20 may generate residual data for the block. The residual block includes residual samples. Each residual sample may indicate a difference between a sample of one of the generated predictive blocks and a corresponding sample of the block. Video encoder 20 may apply a transform to blocks of residual samples to generate transform coefficients. Furthermore, video encoder 20 may quantize the transform coefficients. In some examples, video encoder 20 may generate one or more syntax elements to represent a transform coefficient. Video encoder 20 may entropy encode one or more of the syntax elements representing the transform coefficient.

More specifically, when encoding video data according to HEVC or other video coding specifications, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may include one or more CTBs and may include syntax structures used to encode the samples of the one or more CTBs. For instance, each a CTU may include a CTB of luma samples, two corresponding CTBs of chroma samples, and syntax structures used to encode the samples of the CTBs. In monochrome pictures or pictures having three separate color planes, a CTU may include a single CTB and syntax structures used to encode the samples of the CTB. A CTU may also be referred to as a "tree block" or a "largest coding unit" (LCU). In this disclosure, a "syntax structure" may be defined as zero or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may include one or more coding blocks and syntax structures used to encode samples of the one or more coding blocks. For example, a CU may include a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may include a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may include one or more prediction blocks of a CU and syntax structures used to predict the one or more prediction blocks. For example, a PU may include a prediction block of luma samples, two corresponding prediction blocks of chroma samples, and syntax structures used to predict the prediction blocks. In monochrome pictures or pictures having three separate color planes, a PU may include a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a PU of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a PU of a current picture, video encoder 20 may generate the predictive block of the PU based on decoded samples of a reference picture (i.e., a picture other than the current picture). In HEVC, video encoder 20 generates a "prediction unit" syntax structure within a "coding_unit" syntax structure for inter predicted PUs, but does not generate a "prediction_unit" syntax structure within a "coding_unit" syntax structure for intra predicted PUs. Rather, in HEVC, syntax elements related to intra predicted PUs are included directly in the "coding_unit" syntax structure.

A video coder, such as video encoder 20 or video decoder 30, may perform intra prediction using an intra prediction mode selected from a plurality of available intra prediction modes. The intra prediction modes may include directional intra prediction modes, which may also be referred to as intra prediction directions. Different directional intra prediction modes correspond to different angles. In some examples, to determine a value of a current sample of a predictive block using a directional intra prediction mode, the video coder may determine a point where a line passing through the current sample at the angle corresponding to the directional intra prediction mode intersects a set of border samples. The border samples may include samples in a column immediately left of the predictive block and samples in a row immediately above the predictive block. If the point is between two of the border samples, the video coder may interpolate or otherwise determine a value corresponding to the point. If the point corresponds to a single one of the border samples, the video coder may determine that the value of the point is equal to the border sample. The video coder may set the value of the current sample of the predictive block equal to the determined value of the point.

In HEVC and some other codecs, video encoder 20 encodes a CU using only one prediction mode (i.e., intra prediction or inter prediction). Thus, in HEVC and particular other codecs, video encoder 20 may generate predictive blocks of each PU of a CU using intra prediction or video encoder 20 may generate predictive blocks of each PU of the CU using inter prediction. When video encoder 20 uses inter prediction to encode a CU, video encoder 20 may partition the CU into 2 or 4 PUs, or one PU corresponds to the entire CU. When two PUs are present in one CU, the two PUs can be half size rectangles or two rectangle sizes with ¼ or ¾ size of the CU. In HEVC, there are eight partition modes for a CU coded with inter prediction mode, i.e., PART_2N×2N, PART_2N×N, PART_N×2N, PART_N×N, PART_2N×nU, PART_2N×nD, PART_nL×2N and PART_nR×2N. When a CU is intra predicted, 2N×2N and N×N are the only permissible PU shapes, and within each PU a single intra prediction mode is coded (while chroma prediction mode is signalled at CU level).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks.

For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may include one or more transform blocks. For example, a TU may include a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

A quadtree plus binary tree (QTBT) partition structure is being studied by the Joint Video Exploration Team (JVET). In J. An et al., "Block partitioning structure for next generation video coding", International Telecommunication Union, COM16-C966, September 2015 (hereinafter, "VCEG proposal COM16-C966"), QTBT partitioning techniques were described for future video coding standard beyond HEVC. Simulations have shown that the proposed QTBT structure may be more efficient than the quadtree structure used in HEVC.

In the QTBT structure described in VCEG proposal COM16-C966, a CTB is first partitioned using quadtree partitioning techniques, where the quadtree splitting of one node can be iterated until the node reaches the minimum allowed quadtree leaf node size. The minimum allowed quadtree leaf node size may be indicated to video decoder 30 by the value of the syntax element MinQTSize. If the quadtree leaf node size is not larger than the maximum allowed binary tree root node size (e.g., as denoted by a syntax element MaxBTSize), the quadtree leaf node can be further partitioned using binary tree partitioning. The binary tree partitioning of one node can be iterated until the node reaches the minimum allowed binary tree leaf node size (e.g., as denoted by a syntax element MinBTSize) or the maximum allowed binary tree depth (e.g., as denoted by a syntax element MaxBTDepth). VCEG proposal COM16-C966 uses the term "CU" to refer to binary-tree leaf nodes. In VCEG proposal COM16-C966, CUs are used for prediction (e.g., intra prediction, inter prediction, etc.) and transform without any further partitioning. In general, according to QTBT techniques, there are two splitting types for binary tree splitting: symmetric horizontal splitting and symmetric vertical splitting. In each case, a block is split by dividing the block down the middle, either horizontally or vertically. This differs from quadtree partitioning, which divides a block into four blocks.

In one example of the QTBT partitioning structure, the CTU size is set as 128×128 (e.g., a 128×128 luma block and two corresponding 64×64 chroma blocks), the MinQTSize is set as 16×16, the MaxBTSize is set as 64×64, the MinBTSize (for both width and height) is set as 4, and the MaxBTDepth is set as 4. Quadtree partitioning is applied to the CTU first to generate quadtree leaf nodes. The quadtree leaf nodes may have a size from 16×16 (i.e., the MinQTSize is 16×16) to 128×128 (i.e., the CTU size). According to one example of QTBT partitioning, if the leaf quadtree node is 128×128, the leaf quadtree node cannot be further split by the binary tree, since the size of the leaf quadtree node exceeds the MaxBTSize (i.e., 64×64). Otherwise, the leaf quadtree node is further partitioned by the binary tree. Therefore, the quadtree leaf node is also the root node for the binary tree and has the binary tree depth as 0. The binary tree depth reaching MaxBTDepth (e.g., 4) implies that there is no further splitting. The binary tree node having a width equal to the MinBTSize (e.g., 4) implies that there is no further horizontal splitting. Similarly, the binary tree node having a height equal to MinBTSize implies no further vertical splitting. The leaf nodes of the binary tree (CUs) are further processed (e.g., by performing a prediction process and a transform process) without any further partitioning.

Figures 2A, 2B:
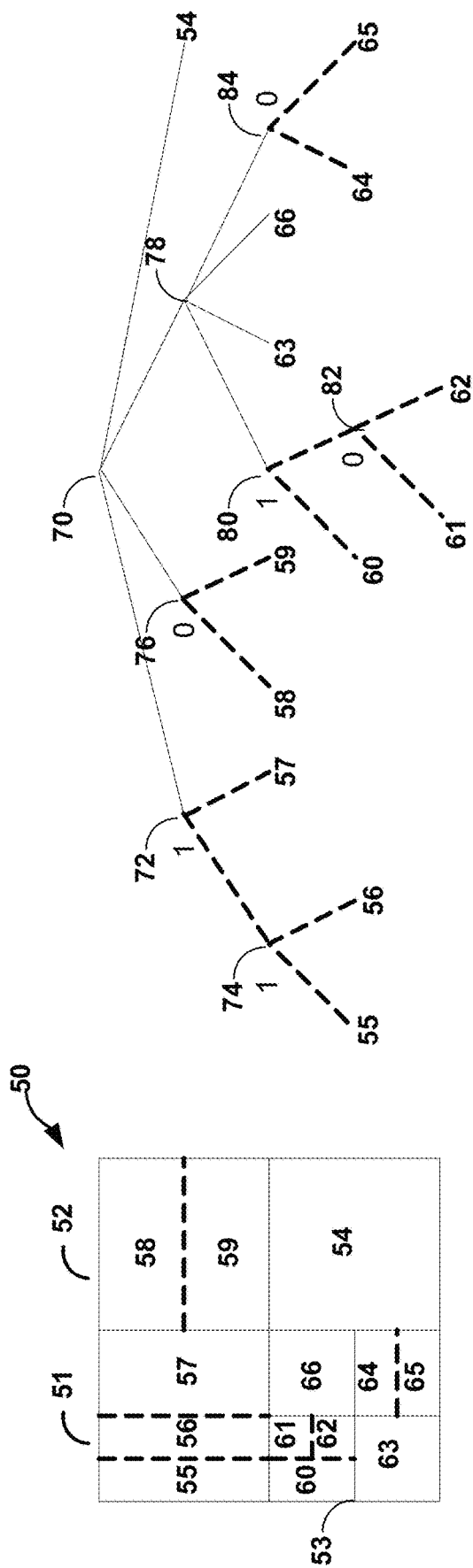
FIG. 2A is a conceptual diagram illustrating an example of block partitioning using a quadtree plus binary tree (QTBT) structure.
FIG. 2B is a conceptual diagram illustrating an example tree structure corresponding to the block partitioning using the QTBT structure of FIG. 2A.

FIG. 2A illustrates an example of a block 50 (e.g., a CTB) partitioned using QTBT partitioning techniques. As shown in FIG. 2A, using QTBT partition techniques, each of the resultant blocks is split symmetrically through the center of each block. FIG. 2B illustrates the tree structure corresponding to the block partitioning of FIG. 2A. The solid lines in FIG. 2B indicate quadtree splitting and dotted lines indicate binary tree splitting. In one example, in each splitting (i.e., non-leaf) node of the binary tree, a syntax element (e.g., a flag) is signaled to indicate the type of splitting performed (e.g., horizontal or vertical), where 0 indicates horizontal splitting and 1 indicates vertical splitting. For the quadtree splitting, there is no need to indicate the splitting type, as quadtree splitting always splits a block horizontally and vertically into 4 sub-blocks with an equal size.

As shown in FIG. 2B, at node 70, block 50 is split into the four blocks 51, 52, 53, and 54, shown in FIG. 2A, using quadtree partitioning. Block 54 is not further split and is therefore a leaf node. At node 72, block 51 is further split into two blocks using binary tree partitioning. As shown in FIG. 2B, node 72 is marked with a 1, indicating vertical splitting. As such, the splitting at node 72 results in block 57 and the block including both blocks 55 and 56. Blocks 55 and 56 are created by a further vertical splitting at node 74. At node 76, block 52 is further split into two blocks 58 and 59 using binary tree partitioning. As shown in FIG. 2B, node 76 is marked with a 1, indicating horizontal splitting.

At node 78, block 53 is split into 4 equal size blocks using quadtree partitioning. Blocks 63 and 66 are created from this quadtree partitioning and are not further split. At node 80, the upper left block is first split using vertical binary tree splitting resulting in block 60 and a right vertical block. The right vertical block is then split using horizontal binary tree splitting into blocks 61 and 62. The lower right block created from the quadtree splitting at node 78, is split at node 84 using horizontal binary tree splitting into blocks 64 and 65.

In one example of QTBT partitioning, luma and chroma partitioning may be performed independently of each other for I-slices, contrary, for example, to HEVC, where the quadtree partitioning is performed jointly for luma and chroma blocks. That is, in some examples being studied, luma blocks and chroma blocks may be partitioned separately such that luma blocks and chroma blocks do not directly overlap. As such, in some examples of QTBT partitioning, chroma blocks may be partitioned in a manner such that at least one partitioned chroma block is not spatially aligned with a single partitioned luma block. That is, the luma samples that are co-located with a particular chroma block may be within two or more different luma partitions.

Video encoder 20 may apply one or more transforms to a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 20 may quantize transform coefficients of the coefficient block. Quantization may reduce the bit depth associated with some or all the transform coefficients. For example, an n-bit transform coefficient may be rounded down to an m-bit transform coefficient during quantization, where n is greater than m. In some examples, video encoder 20 skips quantization.

Video encoder 20 may generate syntax elements indicating some or all the potentially quantized transform coefficients. Video encoder 20 may entropy encode one or more of the syntax elements indicating a quantized transform coefficient. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. The encoded representation of the video data may include an encoded representation of pictures of the video data. For example, the bitstream may include a sequence of bits that forms a representation of encoded pictures of the video data and associated data. In some examples, a representation of an encoded picture may include encoded representations of blocks of the picture.

Video decoder 30 may receive a bitstream generated by video encoder 20. As noted above, the bitstream may include an encoded representation of video data. Video decoder 30 may decode the bitstream to reconstruct pictures of the video data. As part of decoding the bitstream, video decoder 30 may obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures.

For instance, as part of decoding a picture of the video data, video decoder 30 may use inter prediction or intra prediction to generate predictive blocks. Additionally, video decoder 30 may determine transform coefficients based on syntax elements obtained from the bitstream. In some examples, video decoder 30 inverse quantizes the determined transform coefficients. Inverse quantization maps quantized value to a reconstructed value. For instance, video decoder 30 may inverse quantize a value by determining the value multiplied by a quantization step size. Furthermore, video decoder 30 may apply an inverse transform on the determined transform coefficients to determine values of residual samples. Video decoder 30 may reconstruct a block of the picture based on the residual samples and corresponding samples of the generated predictive blocks. For instance, video decoder 30 may add residual samples to corresponding samples of the generated predictive blocks to determine reconstructed samples of the block.

More specifically, in HEVC and other video coding specifications, video decoder 30 may use inter prediction or intra prediction to generate one or more predictive blocks for each PU of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct a coding block of the current CU based on samples of the predictive blocks of the PUs of the current CU and residual samples of the transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

As mentioned above, video encoder 20 and video decoder 30 may apply CABAC encoding and decoding to syntax elements. To apply CABAC encoding to a syntax element, video encoder 20 may binarize the syntax element to form a series of one or more bits, which are referred to as "bins." In addition, video encoder 20 may identify a coding context. The coding context may identify probabilities of bins having particular values. For instance, a coding context may indicate a 0.7 probability of coding a 0-valued bin and a 0.3 probability of coding a 1-valued bin. After identifying the coding context, video encoder 20 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 20 may repeat these steps with the interval being the sub-interval associated with the value of the encoded bit. When video encoder 20 repeats these steps for the next bin, video encoder 20 may use modified probabilities based on the probabilities indicated by the identified coding context and the actual values of bins encoded.

When video decoder 30 performs CABAC decoding on a syntax element, video decoder 30 may identify a coding context. Video decoder 30 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 30 may decode a bin having the value associated with the lower sub-interval. If the encoded value is within the upper sub-interval, video decoder 30 may decode a bin having the value associated with the upper sub-interval. To decode a next bin of the syntax element, video decoder may repeat these steps with the interval being the sub-interval that contains the encoded value. When video decoder repeats these steps for the next bin, video decoder may use modified probabilities based on the probabilities indicated by the identified coding context and the decoded bins. Video decoder 30 may then de-binarize the bins to recover the syntax element.

Rather than performing regular CABAC encoding on all syntax elements, video encoder 20 may encode some bins using bypass CABAC coding. It may be computationally less expensive to perform bypass CABAC coding on a bin than to perform regular CABAC coding on the bin. Furthermore, performing bypass CABAC coding may allow for a higher degree of parallelization and throughput. Bins encoded using bypass CABAC coding may be referred to as "bypass bins." Grouping bypass bins together may increase the throughput of video encoder 20 and video decoder 30. The bypass CABAC coding engine may be able to code several bins in a single cycle, whereas the regular CABAC coding engine may be able to code only a single bin in a cycle. The bypass CABAC coding engine may be simpler because the bypass CABAC coding engine does not select contexts and may assume a probability of ½ for both symbols (0 and 1). Consequently, in bypass CABAC coding, the intervals are split directly in half.

Figure 3:
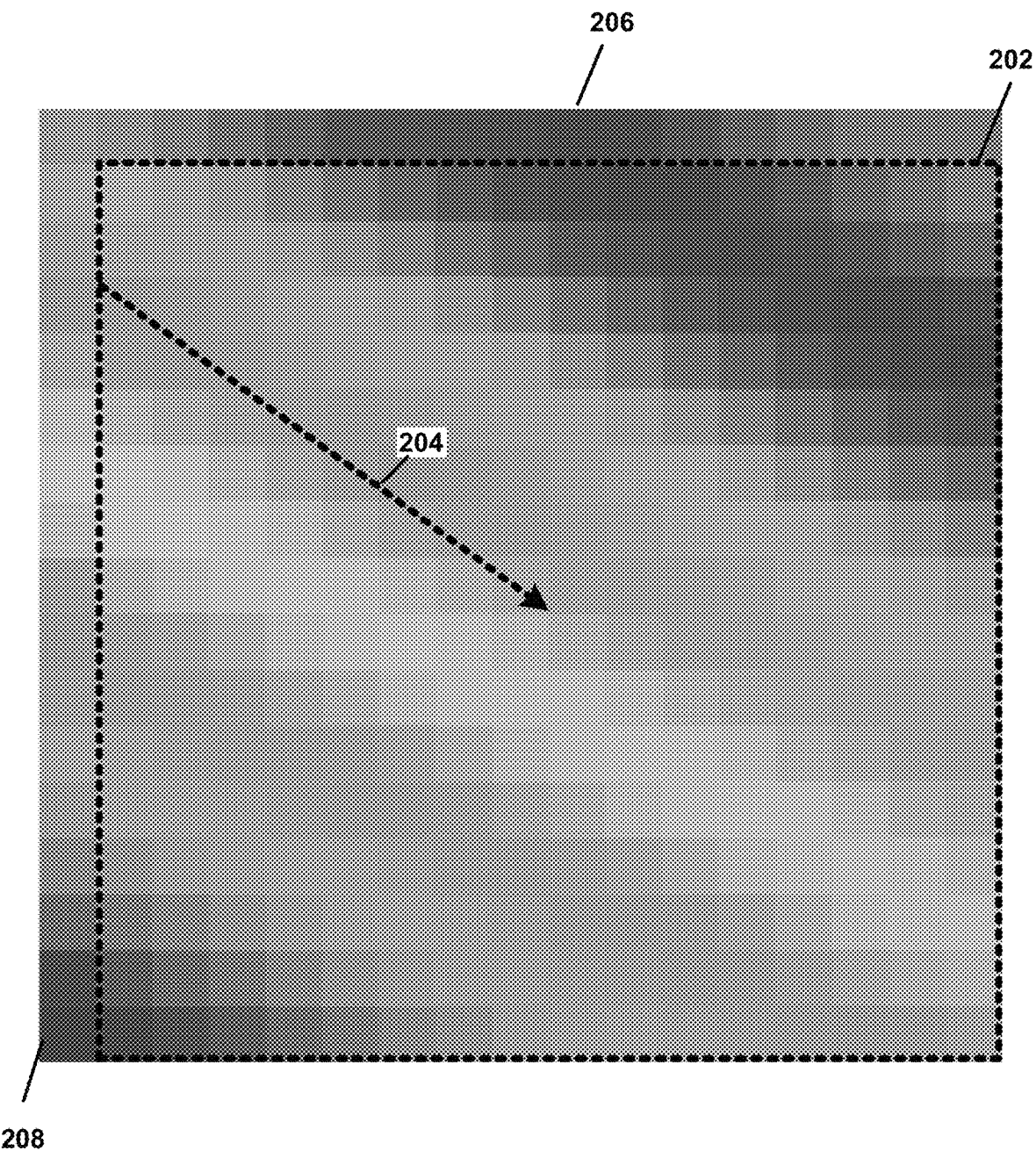
FIG. 3 is an example of intra prediction for a 16×16 block.

In order to code a block of video data, video encoder 20 and video decoder 30 may be configured to perform intra prediction techniques, in some examples. Intra prediction is an image block prediction technique that uses spatially neighboring reconstructed image samples of a current block as predictors. FIG. 3 is a conceptual diagram showing an example of intra prediction for a 16×16 block 202. In some examples, video encoder 20 and/or video decoder 30 can be configured to perform intra prediction on 16×16 block 202. Video encoder 20 and video decoder 30 predict block 202 from above neighboring reconstructed samples 206 and left neighboring reconstructed samples 208 (collectively referred to as reference samples) along a selected prediction direction 204 (e.g., as indicated by the arrow). For example, video encoder 20 may subtract the value of samples of block 202 from prediction values generated from above neighboring reconstructed samples 206 and left neighboring reconstructed samples 208 to produce residual values. Video decoder 30 may generate prediction values from above neighboring reconstructed samples 206 and left neighboring reconstructed samples 208 in the same manner as video encoder 20. Video decoder 30 may then add residual values to the generated prediction values to reconstruct the sample values for block 202. The manner in which the prediction values are generated may depend on the intra prediction mode used. Example intra prediction modes, e.g., as indicated by prediction direction 204, are described in more detail below.

Figure 4:
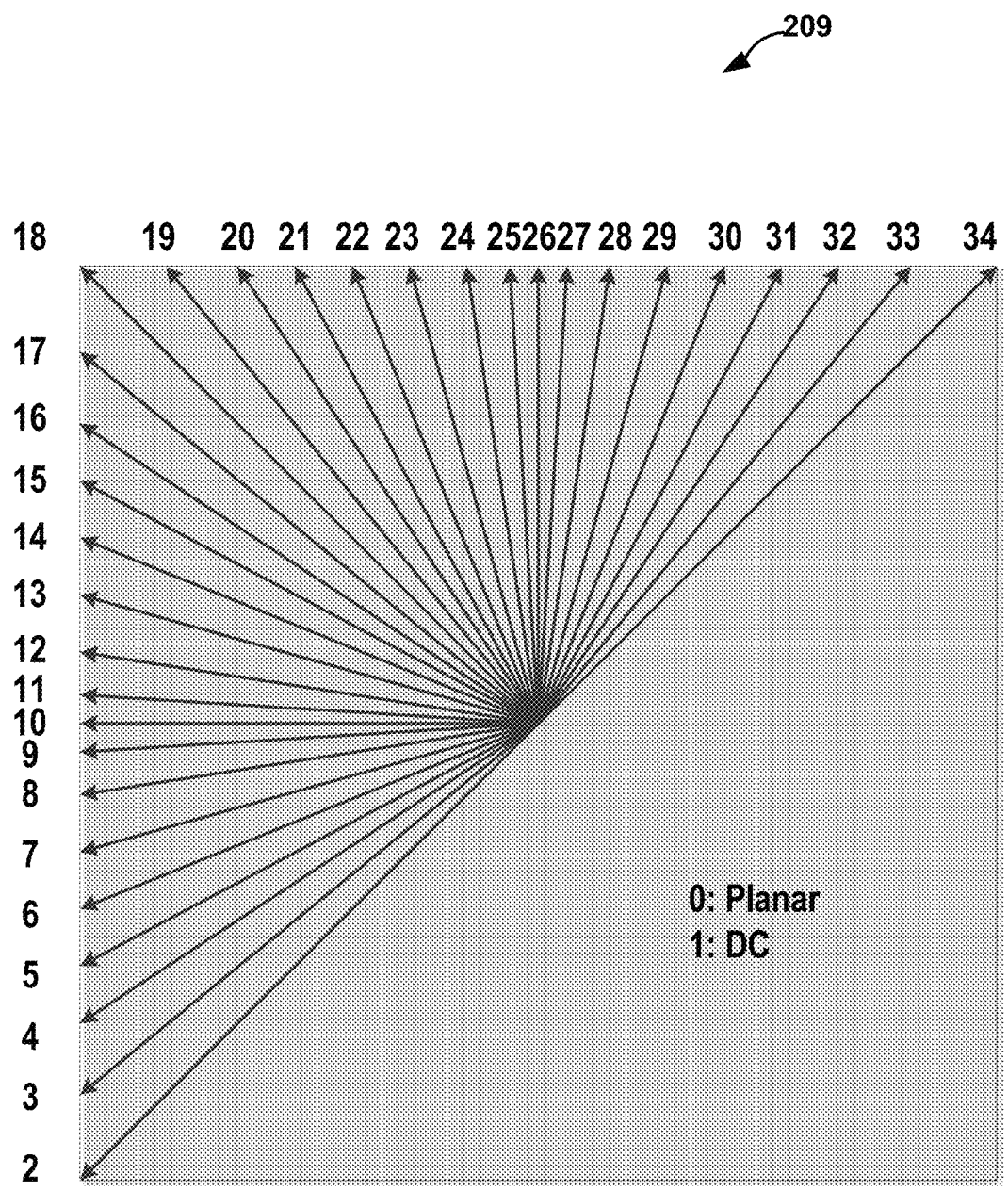
FIG. 4 is an example of 35 intra prediction modes defined in HEVC.

FIG. 4 is a conceptual diagram showing an example of 35 intra prediction modes 209 defined in HEVC. In HEVC, a luma block may be predicted using one of 35 intra prediction modes, including the planar mode, the DC mode and 33 angular modes. The 35 modes of the intra prediction defined in HEVC are indexed as shown in Table 1 below:

TABLE 1

Specification of intra prediction mode and associated names

| Intra prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

Figure 5:
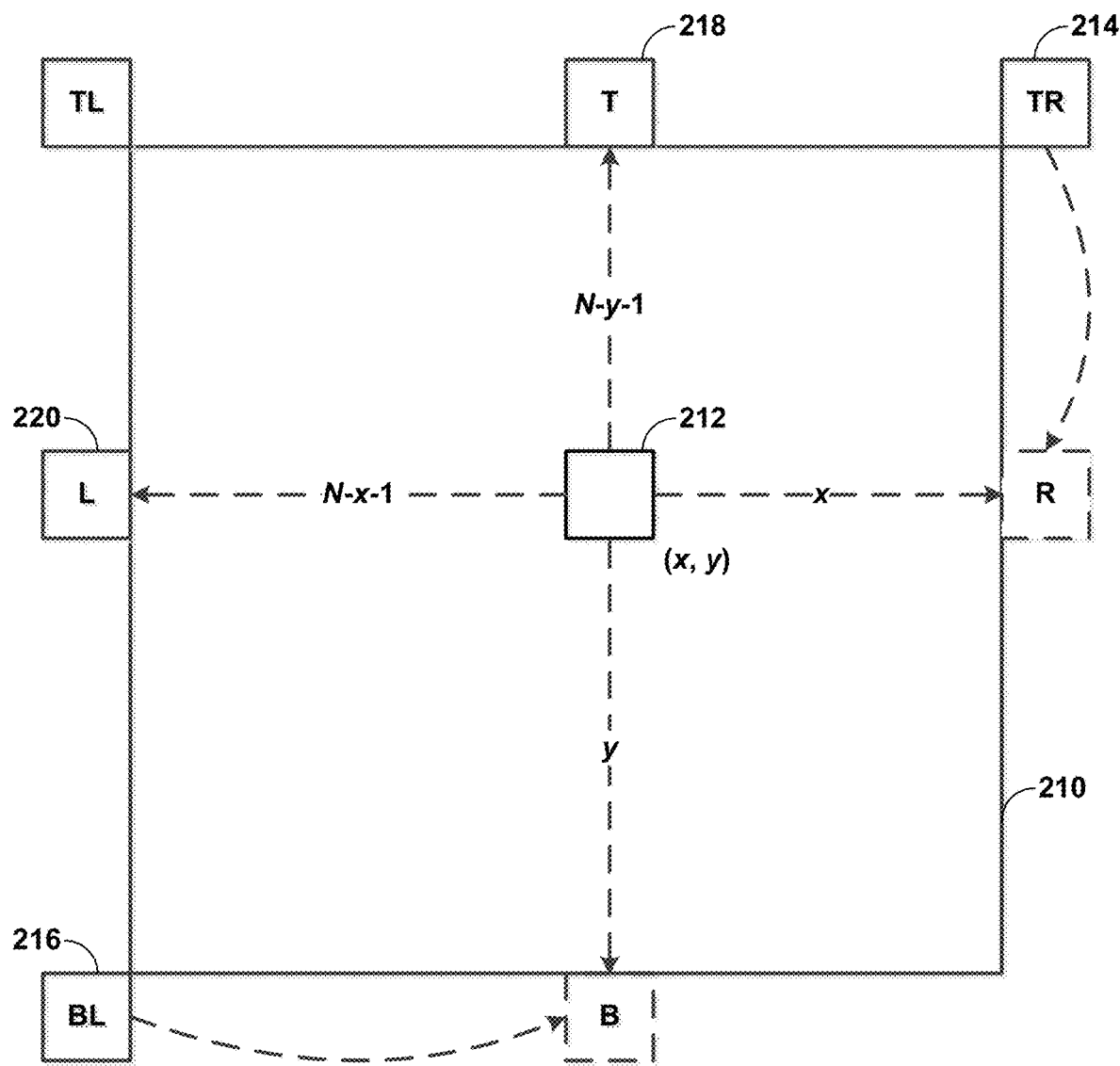
FIG. 5 is an example illustration of planar mode defined in HEVC.

For planar mode, which is typically the most frequently used intra prediction mode, a prediction sample is generated as shown in FIG. 5. To perform planar prediction for an N×N block 210, video encoder 20 and video decoder 30 may be configured to calculate a prediction value $p_{xy}$ for each sample (e.g., sample 212) located at position (x, y). Video encoder 20 and video decoder 30 may be configured to calculate a prediction value $p_{xy}$ using four neighboring reconstructed samples (e.g., reference samples) and a bilinear filter. The four reference samples include the top-right reconstructed sample TR 214, the bottom-left reconstructed sample BL 216, and the two reconstructed samples 218 (T) and 220 (L) located at the same column ($r_{x,-1}$) and row ($r_{-1,y}$), respectively, of the current sample 212. The prediction value $p_{xy}$ for planar mode can be formulated as below:

$$p_{xy}=((N-x1)\cdot L+(N-y1)\cdot T+x1\cdot R+y1\cdot B)/(2*N)$$

where N equals the width or height of the block, x1=x+1, y1=y+1, R equals the sample value of TR, B equals the sample values of BL, T equals the sample value of T, and L equals the sample value of L.

For DC mode, video encoder 20 and video decoder 30 may be configured to fill the prediction block with the average value of the neighboring reconstructed samples. Generally, both planar and DC modes are applied for modeling smoothly varying and constant image regions.

For angular intra prediction modes (e.g., as in HEVC), which can include 33 different prediction directions, video encoder 20 and video decoder 30 may perform intra prediction as follows. For each given angular intra prediction direction, video encoder 20 and video decoder 30 may identify an intra prediction direction with an index, for example, as shown in FIG. 4. For example, intra prediction mode 10 corresponds to a pure horizontal prediction direction, and intra prediction mode 26 corresponds to a pure vertical prediction direction.

Figure 6:
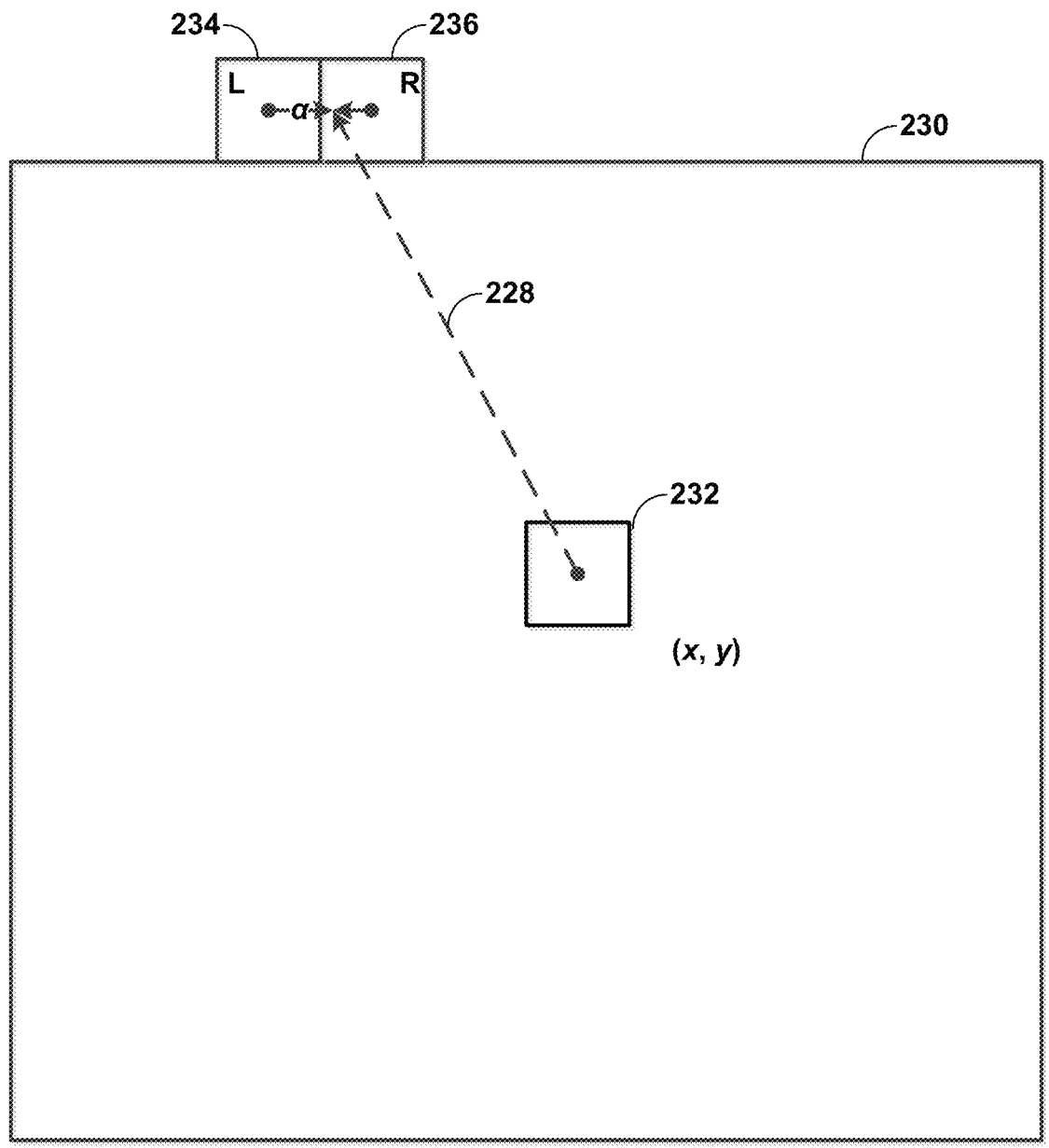
FIG. 6 is an example illustration of a directional intra prediction mode.

FIG. 6 is a conceptual diagram showing an example of angular intra prediction. Given a specific intra prediction direction 228, for each sample of the prediction block, video encoder 20 and video decoder 30 first projects the coordinate (x, y) to the row/column of neighboring reconstructed samples along the prediction direction 228, as shown in the example in FIG. 6. In one example, video encoder 20 and video decoder 30 projects the position 232 at x,y of current sample 230 to the fractional position a between two neighboring reconstructed samples L (234) and R (236). Then, video encoder 20 and video decoder 30 calculates the prediction value $p_{xy}$ for the position 232 using a two-tap bi-linear interpolation filter, formulated as follows:

$$p_{xy}=(1-a)\cdot L+a\cdot R.$$

To avoid floating point operations, in HEVC, the above calculation may be approximated using integer arithmetic as $$P_{xy}=((32-a)\cdot L+a\cdot R+16)>>5,$$

where a is an integer equal to 32*a and >>5 is a bit-wise right shift by 5.

Intra reference smoothing techniques will now be discussed. In some examples, before intra prediction is performed, video encoder 20 and video decoder 30 may be configured to filter the neighboring reference samples using a 2-Tap bilateral or 3-Tap (1,2,1)/4 filter. Such filtering processes may be referred to as intra reference smoothing or mode-dependent intra smoothing (MDIS). When performing intra prediction, given the intra prediction mode index (predModeIntra) and block size (nTbS), video encoder 20 and video decoder 30 determines whether an reference smoothing process is performed and which filter (e.g., smoothing filter) is used. An example of intra reference sample smoothing in HEVC is reproduced below:

8.4.4.2.3 Filtering Process of Neighboring Samples

Inputs to this process are:
the neighbouring samples p[x][y], with x=−1, y=−1. nTbS*2−1 and x=0. nTbS*2−1, y=−1,
a variable nTbS specifying the transform block size.

Outputs of this process are the filtered samples pF[x][y], with x=−1, y=−1. nTbS*2−1 and x=0. nTbS*2−1, y=−1.

The variable filterFlag is derived as follows:
If one or more of the following conditions are true, filterFlag is set equal to 0:
predModeIntra is equal to INTRA_DC.
nTbS is equal 4.
Otherwise, the following applies:
The variable minDistVerHor is set equal to Min(Abs(predModeIntra−26), Abs(predModeIntra−10)).
The variable intraHorVerDistThres[nTbS] is specified in Table 8-3.
The variable filterFlag is derived as follows:
If minDistVerHor is greater than intraHorVerDistThres[nTbS], filterFlag is set equal to 1.
Otherwise, filterFlag is set equal to 0.

TABLE 8-3

Specification of intraHorVerDistThres[nTbS]
for various transform block sizes

|  | nTbS = 8 | nTbS = 16 | nTbS = 32 |
|---|---|---|---|
| intraHorVerDistThres[nTbS] | 7 | 1 | 0 |

When filterFlag is equal to 1, the following applies:
The variable biIntFlag is derived as follows:
If all of the following conditions are true, biIntFlag is set equal to 1:
strong_intra_smoothing_enabled_flag is equal to 1:
nTbS is equal to 32

$Abs(p[-1][-1]+p[nTbS*2-1][-1]-2*p[nTbS-1][-1])$
$<(1<<(BitDepth_Y-5))$ $Abs(p[-1][-1]+p[-1][nTbS*2-1]-2*p[-1][nTbS-1])$
$<(1<<(BitDepth_Y-5))$ Otherwise, biIntFlag is set equal to 0.
The filtering is performed as follows:
If biIntFlag is equal to 1, the filtered sample values pF[x][y] with x=−1, y=−1.63 and x=0.63, y=−1 are derived as follows:

$$pF[-1][-1]=p[-1][-1] \quad (8\text{-}30)$$

$$pF[-1][y]=((63-y)*p[-1][-1]+(y+1)*p[-1][63]+32)$$
$$>>6 \text{ for } y=0.62 \quad (8\text{-}31)$$

$$pF[-1][63]=p[-1][63] \quad (8\text{-}32)$$

$$pF[x][-1]=((63-x)*p[-1][-1]+(x+1)*p[63][-1]+32)$$
$$>>6 \text{ for } x=0.62 \quad (8\text{-}33)$$

$$pF[63][-1]=p[63][-1] \quad (8\text{-}34)$$

Otherwise (biIntFlag is equal to 0), the filtered sample values pF[x][y] with x=−1, y=−1. nTbS*2−1 and x=0. nTbS*2−1, y=−1 are derived as follows:

$$pF[-1][-1]=(p[-1][0]+2*P[-1][-1]+p[0][-1]+2)>>2 \quad (8\text{-}35)$$

$$pF[-1][y]=(p[-1][y+1]+2*p[-1][y]+p[-1][y-1]+2)$$
$$>>2 \text{ for } y=0 \ldots nTbS*2-2 \quad (8\text{-}36)$$

$$pF[-1][nTbS*2-1]=p[-1][nTbS*2-1] \quad (8\text{-}37)$$

$$pF[x][-1]=(p[x-1][-1]+2*p[x][-1]+p[x+1][-1]+2)$$
$$>>2 \text{ for } x=0 \ldots nTbS*2-2 \quad (8\text{-}38)$$

$$pF[nTbS*2-1][-1]=p[nTbS*2-1][-1] \quad (8\text{-}39)$$

Figure 7:
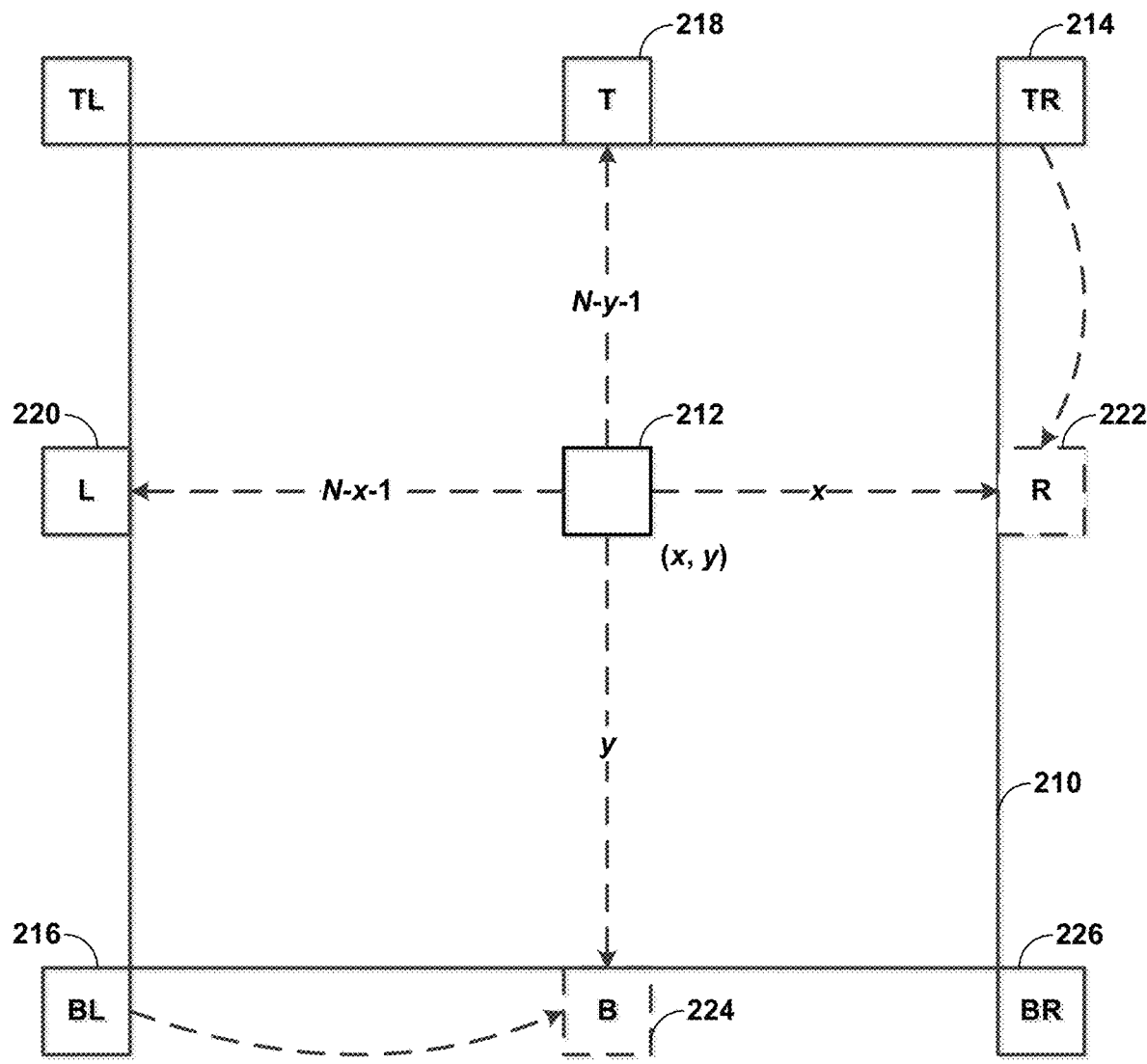
FIG. 7 is an example of unequal weight prediction.

Example techniques for an unequal weight planar mode will now be discussed. In K. Panusopone, S. Hong, L. Wang, "Improvements on AMT for inter prediction residuals," Joint Video Exploration Team (WET) of ITU-T SG 16 WP 3 and ISO/IEC JTC 1/SC 29/WG 11, Doc. JVET-E0068, 5$^{th}$ Meeting, an unequal weight planar (UWP) mode was proposed. In an example UWP mode, for a WxH block, video encoder 20 and video decoder 30 may perform the planar prediction, as shown in FIG. 7. FIG. 7 shows the same block and samples as FIG. 5, but the prediction value $p_{xy}$ is calculated in a different manner. For example, video encoder 20 and video decoder 30 may be configured to calculate the prediction value $p_{xy}$ as $p_{xy}=((y1*H*(W-x1))\cdot L+(x1*W*(H-y1))\cdot T+(x1*y1*H)\cdot R+(x1*y1*W)\cdot B)/(W*H*(x1+y1))$, where R and B are calcuated as below, $$R=(TR*(H-y1)+BR*y1)/H$$

$$B=(BL*(W-x1)+BR*(k+1))/W,$$

and where BR is calculated as below, $$BR=(H*TR+W*BL)/(W+H)$$

In this example, y1 and x1 are defined as in the example of FIG. 5. W is the width of the block 210 in samples (e.g., either luma samples or chroma samples) and H is the height of block 210 in samples (e.g., either luma samples or chroma samples). L is the sample value of sample 220. T is the sample value of sample 218. R is the sample value of sample 222. B is the sample value of sample 224. BR is the sample value of sample 226.

Position-dependent prediction combination (PDPC) mode will now be discussed. U.S. Patent Publication No. 2017/0094285, published Mar. 30, 2017, described a set of parameterized equations defining how to combine predictions based on filtered and unfiltered reference values, and based on the position of the predicted pixel.

Figure 8A:
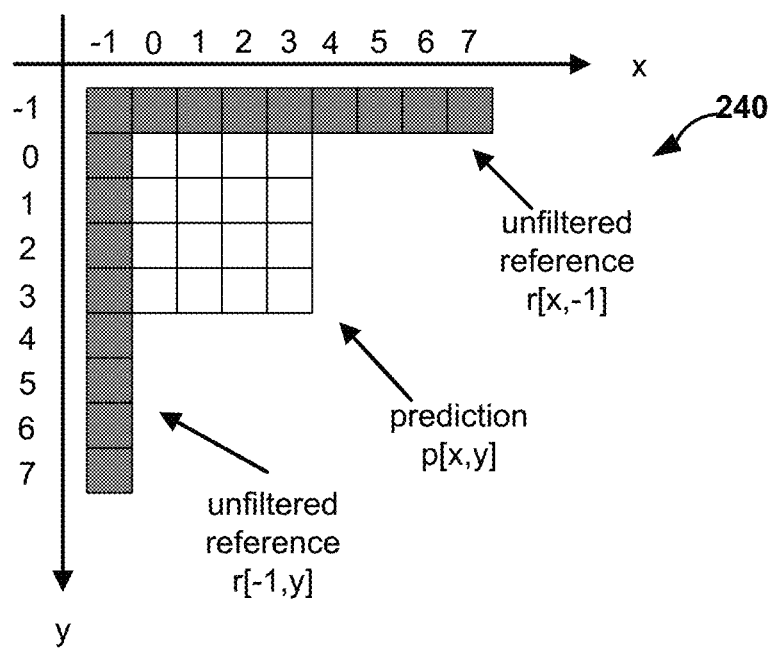
FIGS. 8A and 8B are examples of data available for position-dependent prediction combination, for 4×4 pixel blocks.
Figure 8B:
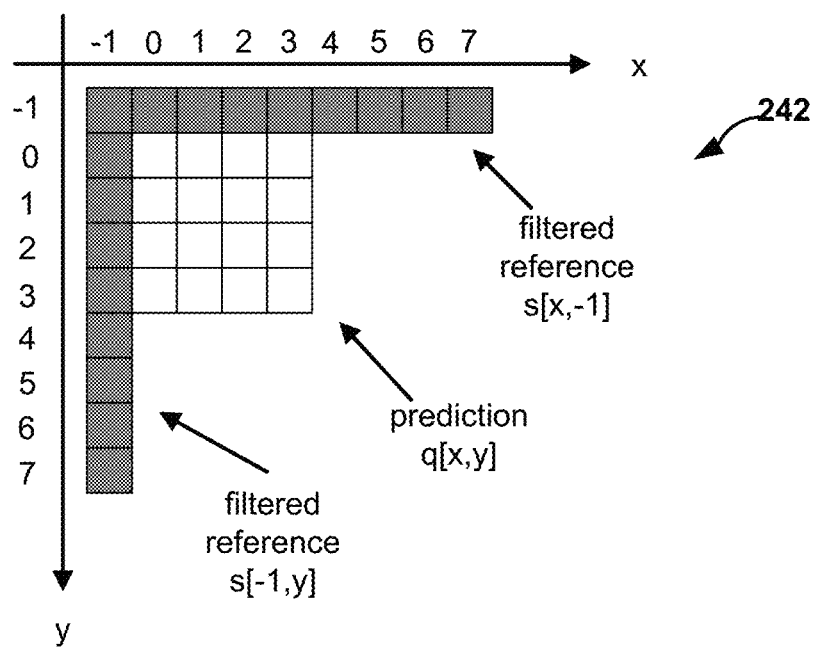

FIGS. 8A and 8B are examples of data available for position-dependent prediction combination, for 4×4 pixel blocks. FIG. 8A illustrates a prediction of a 4×4 block (p) 240 using an unfiltered reference (r) according to techniques of the present disclosure. FIG. 8B illustrates a prediction of a 4×4 block (q) 242 using a filtered reference (s) according to techniques of the present disclosure. While both FIGS. 8A and 8B illustrate a 4×4 pixel block and 17 (4×4+1) respective reference values, the techniques of the present disclosure may be applied to any block size and number of reference values.

Video encoder 20 and/or video decoder 30, when performing the PDPC coding mode, may utilize a combination between the filtered (q) and unfiltered (p) predictions, such that a predicted block for a current block to be coded can be computed using pixel values from both the filtered (s) and unfiltered (r) reference arrays.

With coding video data using PDPC mode, given any two sets of pixel predictions $p_r[x, y]$ and $q_s[x, y]$, computed using only the unfiltered and filtered (or smoothed) references r and s, respectively, the combined predicted value of a pixel, denoted by v[x, y], is defined by $$v[x,y]=c[x,y]p_r[x,y]+(1-c[x,y])q_s[x,y]$$

where c[x, y] is the set of combination parameters, of which the value depends on pixel position.

One practical implementation of PDPC uses the formula:

$$v[x, y] = \left\lfloor \frac{c_1^{(v)}r[x, -1] - c_2^{(v)}r[-1, -1]}{2^{\lfloor y/d_v \rfloor}} \right\rfloor + \left\lfloor \frac{c_1^{(h)}r[-1, y] - c_2^{(h)}r[-1, -1]}{2^{\lfloor x/d_h \rfloor}} \right\rfloor + b[x, y]p_s^{(HEVC)}[x, y]$$

where $c_1^v, c_2^v, c_1^h, c_2^h$, g, and $d_v, d_h \in \{1,2\}$, are pre-defined parameters controlling how fast the weights for left, top-left and top unfiltered reference sample are decaying along the horizontal and vertical direction, N is the block size, $q_s^{(HEVC)}[x, y]$ is prediction values computed using the according to the HEVC standard, for the specific mode, using filtered references, and $$b[x, y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor$$

is a normalization factor, defined by the pre-defined parameters. Reference filters, e.g., 3-tap {1,2,1}, 5-Tap {1,4,6,4,1} or 7-tap {1,6,15,20,15,6,1}, reference filters may be applied on unfiltered references to generate the filtered references. Low-pass filters may be used as reference filters, a typical low-pass filter can only have positive filter coefficients, or negative filter coefficients can be present, but the absolute value is relatively small or close to zero.

Example bilateral filtering techniques were described in C. Tomasi and R. Manduchi, "Bilateral filtering for gray and color images", in Proc. of IEEE ICCV, Bombay, India, January 1998. In some examples, bilateral filtering may be used to avoid undesirable over-smoothing for pixels along an edge (e.g., an edge of a block of samples). One aspect of bilateral filtering is that the weighting of neighboring samples takes the pixel/samples values themselves into account to apply more weighting to those pixels with similar luminance or chrominance values. A sample located at position (i, j) is filtered using its neighboring sample at position (k, l). The weight ω(i, j, k, l) is the weight assigned for sample (k, l) to filter the sample (i, j), and is defined as:

$$\omega(i, j, k, l) = e^{\left(-\frac{(i-k)^2+(j-l)^2}{2\sigma_d^2} - \frac{\|I(i,j)-I(k,l)\|^2}{2\sigma_r^2}\right)}$$

In the equation above, I(i, j) and I(k, l) are the intensity values of samples (i, j) and (k, l), respectively. $\sigma_d$ is the spatial parameter, and $\sigma^r$ is the range parameter. The filtering process with the filtered sample value denoted by $I_D(i, j)$ may be defined as:

$$I_D(i, j) = \frac{\sum_{k,l} I(k, l) * \omega(i, j, k, l)}{\sum_{k,l} \omega(i, j, k, l)}$$

The properties (or strength) of the bilateral titter is controlled by the parameters $\sigma_d$ and $\sigma_r$. Neighbor samples located closer to the sample to be filtered, and neighbor samples having smaller intensity difference relative to the sample to be filtered, may be associated with larger weight than neighbor samples further away from the current sample and/or neighbor samples with larger intensity differences relative to the current sample.

Non-local filters will now be discussed. In bilateral filtering, the accuracy of the filter weights used partially depends on the whether the difference between intensity of the sample to be filtered (I(i,j)) and the intensity of the neighbor sample (I(k,l)) is reliable or not. Therefore, any noise may create some inaccuracy on the assignment of weights. In addition, weightings defined in a bilateral filter may be derived by comparing the values of two samples. Therefore, weights for bilateral filters are not determined considering the overall textures/structure/patterns present in images, as the weights are only determined based on a comparison of a few samples (e.g., 2) in isolation. However, in video sequences or still images, there may be large amounts of repetitive patterns like edges, textures, etc., which can be utilized to further strengthen the reliability of weightings.

To achieve more noise-resistant weightings and utilize the structural image patterns, non-local filtering was described in A. Buades, B. Coll, and J. M. Morel, "A non-local algorithm for image denoising," In: Proc. IEEE CVPR, vol. 2, 2005. In non-local filtering, instead of measuring the absolute difference between the intensity of the current sample (I(i,j)) and the intensity of the neighboring sample (I(k,l)), the sum of weighted absolute differences of the sample values between two windows centered at position (i,j) and position (k, l) are compared. In this way, the weightings may be more tolerant to the noise and the structural information of block of video data is generally kept better than some example bilateral filters.

In examples of JEM, there are several coding tools that have interactions with intra reference smoothing, e.g., the PDPC coding mode, Non-Separable Secondary Transform (NSST), enhanced multiple transforms, and others. For image regions with rich slanting texture patterns, some current example intra reference smoothing techniques may reduce the coding efficiency of intra prediction along sharp edges. The HEVC planar mode may be improved with more accurate intra prediction smoothing filter coefficients, especially for non-square blocks. Increasing the accuracy of intra prediction smoothing filter coefficients may increase coding efficiency. Increasing coding efficiency may improve devices by potentially allowing the devices to present more detailed pictures and/or by reducing the device's need for potentially scarce transmission resources.

To address the problems mentioned above, following techniques are described. A device (e.g., video encoder 20 and/or video decoder 30) may be configured to apply each of the following itemized techniques individually. Alternatively, video encoder 20 and/or video decoder 30 may be configured to apply the following techniques in any combination. The following describes techniques for intra reference sample smoothing and/or intra reference sample filtering that may be applied together with MDIS. That is, the techniques of this disclosure may be used for intra reference sample smoothing, when such smoothing is applied in a mode dependent way (e.g., as in MDIS). Additionally, the techniques of this disclosure may be used to filter intra reference samples for any intra prediction mode. For example, the following itemized techniques are also applicable to other intra reference sample smoothing methods, including but not limited to reference sample adaptive filtering (RSAF), and/or other linear or non-linear reference sample filtering methods.

In accordance with a first example of the disclosure, video encoder 20 and video decoder 30 may be configured to determine whether or not MDIS or another intra reference sample filtering method is to be used when performing intra prediction on a block of video data based on already coded information or the usage of existing coding tools. For example, video encoder 20 and video decoder 30 may be configured to determine whether or not to use MDIS or another intra reference sample filtering method based on the usage of an Enhanced Multiple Transform (EMT) (e.g., based on a value of an EMT flag), the EMT transform used (e.g., based on a value of an EMT index), the non-separable secondary transform used (e.g., based on a value of an NSST index), whether or not PDPC mode is used (e.g., based on a value of a PDPC flag), a block size of the block being coded, a block width/height of the block being coded, a prediction sample position of the block being coded, and/or a number of non-zero transform coefficients for the block being coded.

In one example, video encoder 20 may be configured to use MDIS or another intra reference sample filtering method for a block of video data when a particular, e.g., non-separable, secondary transform is used for the block of video data. For example, video encoder 20 may be configured to use MDIS or another intra reference sample filtering method for the block of video data when the secondary transform determined is the non-separable secondary transform having the NSST index of 1 for the block of video data. Likewise, video decoder 30 may be configured to use MDIS or another intra reference sample filtering method for the block of video data when the NSST index that is received and/or derived by video decoder 30 is equal to a certain index (e.g., 1) for the block of video data. In some examples, video decoder 30 may be configured to receive the NSST index in an encoded video bitstream. In other examples, video decoder 30 may be configured to derive the NSST index without signaling.

In another example, video encoder 20 may be configured to use MDIS or another intra reference sample filtering method for the block of video data when the secondary transform determined is a non-separable secondary transform not having the NSST index of 0 for the block of video data. An NSST index that is not 0 indicates that some type of secondary transform is used. Likewise, video decoder 30 may be configured to use MDIS or another intra reference sample filtering method for the block of video data when the NSST index that is received and/or derived by video decoder 30 is not equal to 0 for the block of video data.

In another example, video encoder 20 may be configured to use MDIS or another intra reference sample filtering method for the block of video data when the secondary transform determined is a non-separable secondary transform having the NSST index of 0 for the block of video data. An NSST index that is 0 indicates that a secondary transform is not used. Likewise, video decoder 30 may be configured to use MDIS or another intra reference sample filtering method for the block of video data when the NSST index that is received and/or derived by video decoder 30 is equal to 0 for the block of video data.

In another example, video encoder 20 may be configured to use MDIS or another intra reference sample filtering method for a block of video data when video encoder 20 determines not to use PDPC mode for the block of video data. Video encoder 20 may indicate that PDPC mode is not used for the block of video data by signaling a PDPC mode flag with a value of 0. Video decoder 30 may be configured to use MDIS or another intra reference sample filtering method for the block of video data when the PDPC mode flag that is received and/or derived by video decoder 30 is equal to 0.

In addition to the above conditions concerning the NSST index and PDPC mode flag, video encoder 20 and video decoder 30 may be further configured to determine the use of MDIS or another intra reference sample filtering method for a block of video data based on the intra prediction mode used to code the block. In some examples, video encoder 20 and video decoder 30 may be configured to use MDIS or another intra reference sample filtering method for all intra prediction modes. In other examples, video encoder 20 and video decoder 30 may be configured to use MDIS or another intra reference sample filtering method for a predetermined subset of intra prediction modes In another example of the disclosure, video encoder 20 and video decoder 30 may be configured to determine to use MDIS or another intra reference sample filtering method for intra prediction based on combinations of already coded information or the usage of existing coding tools, including but not limited to: EMT flag, EMT index, NSST index, PDPC flag, block size, block width/height, prediction sample position, number of non-zero transform coefficients. For example, video encoder 20 and video decoder 30 may be configured to use MDIS or another intra reference sample filtering method when the NSST index is 0 (i.e., no secondary transform is used) and the PDPC mode flag is 0 (PDPC is not applied).

In a second example of the disclosure, when MDIS is used, video encoder 20 and video decoder 30 may determine which intra reference smoothing filter (e.g., the values of the filter coefficients and the number of filter taps) is applied for intra prediction based on already coded information, including but not limited to: intra prediction mode, EMT flag, EMT index, NSST index, PDPC flag, block size, reference sample location, prediction sample position, and/or the number of non-zero transform coefficients.

In one example, video encoder 20 and video decoder 30 may store a set of pre-defined filters to use for MDIS. From this set of pre-defined filters, video encoder 20 and video decoder 30 may be configured to determine a subset of filters for a given intra prediction mode (e.g., for a given intra prediction direction of FIG. 4). In some examples, the subset of filters for a particular intra prediction mode may be less than the entire set of filters for MDIS and may include only one filter. In other examples, the subset of filters for a particular intra prediction mode may include the entire set of filters.

When performing intra prediction, given the prediction sample location, video encoder 20 and video decoder 30 may be configured to determine that one filter from the determined subset of filters for the particular intra prediction mode is applied to the intra reference samples to generate the intra prediction sample value. In some examples, video encoder 20 and video decoder 30 may be configured to apply a stronger smoothing filter to reference samples that are further from the prediction samples relative to reference samples that are closer to the prediction samples. Video encoder 20 and video decoder 30 may be configured to store pre-defined table(s) that indicate the type of filtered reference to be used for each pixel in a block. In some examples, for planar mode, the top-right and bottom left reference sample of a block of video data may be filtered with a different filter than was applied to the top reference sample and the left reference sample.

In accordance with a third example of the disclosure, video encoder 20 and video decoder 30 may be configured to use a bilateral filter for intra reference smoothing. For example, with reference to a video encoding process, video encoder 20 may determine to encode a current block of video data using a particular intra prediction mode. Prior to performing the intra prediction, video encoder 20 may be configured to apply a bilateral filter to intra prediction reference samples for the particular intra prediction mode. After the intra prediction reference samples are filtered, prediction values may be determined from the filtered intra reference samples. The samples of the current block may then be predicted from the prediction values to produce residual values. The residual values may then be transformed to form transform coefficients. The transform coefficients may then be encoded as discussed above.

Similarly, video decoder 30 may be configured to receive an encoded current block of video data that was encoded using a particular intra prediction mode. The particular intra prediction mode for the block may be indicated by the value of a syntax element received in the encoded video bitstream. Video decoder 30 may entropy decode the encoded block of video data to recover the transform coefficients. Video decoder 30 may receive the encoded block of video data as part of the encoded video bitstream. Video decoder 30 may apply an inverse transform to transform the transform coefficients to recover the residual data. Prior to performing the intra prediction, video decoder 30 may be configured to apply a bilateral filter to intra prediction reference samples from previously decoded blocks. Video decoder 30 may be configured to determine the filter coefficients for the bilateral filter based on the particular intra prediction mode. After the intra prediction reference samples are filtered, prediction values may be determined from the filtered intra reference samples. The samples of the current block may then be predicted from the prediction values and the residual values. For example, prediction values obtained from the filtered intra prediction reference samples may be added to the residual data to recover the samples values for the current block of video data.

In one example of the disclosure, video encoder 20 and video decoder 30 may determine the filter coefficients of the bilateral filter used for intra reference smoothing (e.g., using MDIS) based on the distance ($\Delta d$) in number of samples from the filter taps (e.g., other neighboring reference samples) to the reference sample to be filtered, and the pixel value difference ($\Delta I$) of the filter tap compared to the reference sample to be filtered. In this example, the distance may be measured in the number of samples. For example, if the sample to be filtered is at position (0,0), a filter tap that is directly to the left of the sample to be filtered is one sample away on the x axis (−1, 0).

In one example, video encoder 20 and video decoder 30 may be configured to apply a 5-tap bilateral filter, having parameters $\sigma_0$ and $\sigma_1$, to intra prediction reference sample $r_x$ (where x is the location of the reference sample to be filtered). Video encoder 20 and video decoder 30 may be configured to generate the 5-tap bilateral filter (f) as f={$f_{-2}$, $f_{-1}$, $f_0$, $f_1$, $f_2$}/($f_{-2}$+$f_{-1}$+$f_0$+$f_1$+$f_2$), where $$f_i = a^{-\left(\frac{|i|^2}{\sigma_0} + \frac{|r_{x+i}-r_x|^2}{\sigma_1}\right)}.$$

In this equation the variable i represents the distance between the sample to be filtered and the filter tap. The term $r_{x+i}-r_x$ represents the difference in intensity between the filter tap at position x+i and the intra reference sample to be filtered ($r_x$).

In some examples, the parameters in the equation above (e.g., a, $\sigma_0$ and $\sigma_1$) for the bilateral filter may be pre-defined constants that are stored in memory at both video encoder 20 and video decoder 30. The parameters $\sigma_0$ and $\sigma_1$ are smoothing parameters. In other examples, video encoder 20 may be configured to signal the parameters in the equation above (e.g., a, $\sigma_0$ and $\sigma_1$) in high-level syntax elements in the encoded video bitstream, including but not limited to a video parameter set (VPS), a sequence parameter set (SPS), a picture parameter set (PPS), and/or a slice header. Video decoder 30 may be configured to receive and parse such high-level syntax to recover the filter parameters. In still other examples, video encoder 20 and video decoder 30 may be configured to derive the parameters in the equation above (e.g., a, $\sigma_0$ and $\sigma_1$) for the bilateral filter based on one or more of statistics of reconstructed image samples, image resolution, estimated noise statistics (e.g., variance, standard variation, etc.), parameters used in a previous picture, slice type, temporal layer, and/or quantization parameters.

The parameters used in the bilateral filter may be signaled or derived for each block, or for a group of selected blocks. In other examples, video encoder 20 and video decoder 30 may be configured to determine the parameters based on coded information, including but not limited to intra prediction mode, indices/flags used for other coding tools (e.g., PDPC, NSST, EMT and etc.), a coded block flag (CBF) that indicates whether or not a block has non-zero transform coefficients, whether the block is a luma block, whether the block is a chroma block, the bit-depth (e.g., as indicated by the bitdepth syntax element) of the image samples, block size, block width/height, reference sample location, prediction sample position, and/or bilateral filter parameters used in spatial/temporal neighboring blocks.

In one example of the disclosure, the parameter a is set to Napier's constant (2.71828, also referred to as Euler's number), $\sigma_0=2.4$, and $\sigma_1=260$. In other example of the disclosure, video encoder 20 and video decoder 30 may be configured to calculate the bilateral filter using powers of 2. For example, a is set to a power of 2 (e.g., 2) such that $$f_i = 2^{-\left(\frac{|i|^2}{\sigma_0} + \frac{|r_{x+i}-r_x|^2}{\sigma_1}\right)}.$$

This formulation may be used for implementation simplification since powers of 2 can be approximated with multiplication and shifts.

In another example of the disclosure, video encoder 20 and video decoder 30 may be configured to use the bilateral filter described above to generate the reference samples and replaces the unfiltered/filtered reference samples applied in PDPC mode. In this example, the following alternatives can be applied individually or jointly:

In some examples, video encoder 20 and video decoder 30 may be configured to apply the bilateral filter on the unfiltered reference samples, and the generated reference samples replace the unfiltered reference samples used in PDPC mode.

In some examples, the bilateral filter replaces the filter (applied on reference samples, e.g., a low-pass filter) used in PDPC to generate the filtered reference samples.

In some examples, to generate the filtered reference samples as used in PDPC, video encoder 20 and video decoder 30 may be configured to first apply a bilateral filter on unfiltered reference samples, then a linear filter (e.g., a low-pass filter) is further applied on top of the results of the bilateral filtering.

In some examples, to generate the filtered reference samples as used in PDPC, video encoder 20 and video decoder 30 may be configured to first apply a linear filter (e.g., a low-pass filter) on unfiltered reference samples, then a bilateral filter is further applied on top of the results of the linear filter.

In another example of the disclosure, video encoder 20 and video decoder 30 may be configured to use a non-local bilateral filter (also called a non-local filter or a non-local means filter) to generate the reference samples and may replace the unfiltered/filtered reference samples applied in PDPC. The following alternatives can be applied individually or jointly:

In some examples, the non-local bilateral filter is applied on the unfiltered reference samples, and the generated reference samples replaces the unfiltered reference samples used in PDPC.

In some examples, the non-local bilateral filter replaces the filter (applied on reference samples, e.g., a low-pass filter) used in PDPC to generate the filtered reference samples.

In some examples, to generate the filtered reference samples as used in PDPC, a linear filter (e.g., a low-pass filter) is first applied on unfiltered reference samples, then a non-local bilateral filter is further applied on top of the results of the linear filter.

In some examples, multiple reference lines (e.g., multiple rows or columns of sample values) may be filtered by the bilateral or non-local bilateral filter. In this case, the smoothing filter becomes a 2-D filter with the filter support covering multiple lines of reference samples.

The bilateral/non-local filters described above may be used in Linear Model (LM) mode to downsample the co-located reconstructed luma samples. The "Linear Model mode" may use a linear model to predict chroma from luma as a chroma intra prediction mode.

In another example of the disclosure, video encoder 20 and video decoder 30 may be configured to filter intra prediction reference samples with a bilateral and/or non-local filter as described above, and the prediction samples may be generated by calculating the weighted sum of filtered reference samples. In some examples, the weightings on reference samples used to generate the prediction samples are defined by unequal-weight planar mode, as described in K. Panusopone, S. Hong and L. Wang, "Unequal Weight Planar Prediction and Constrained PDPC", JVET-E0068, 5th Meeting, January 2017, or unequal weight diagonal mode as described in K. Panusopone, Y. Yu and L. Wang, "Weighted Angular Prediction", JVET-F0104, 6th Meeting, April 2017. In some examples, the weightings on reference samples used to generate the prediction samples are defined by PDPC mode.

If a prediction direction is specified, e.g., vertical prediction, horizontal prediction or diagonal prediction, the weights on reference samples may be derived according to the distance between the prediction sample and the reference sample along the prediction direction. If no prediction direction is specified, e.g., planar mode, or DC mode, then the weights on reference samples may be derived according to the horizontal and vertical coordinates of the prediction sample, which correspond to the distance to the left column of reference samples and the distance to the top row of reference samples.

Since the input value to the bilateral/non-local filter are limited numbers (e.g., 0-255), the weightings corresponding to different reference sample differences may be pre-calculated and stored in a look-up table. In this way, during reference sample filtering, instead of calculating those weightings on the fly, video encoder 20 and video decoder 30 may derive the weightings by checking the look-up table with the calculated sample difference.

In accordance with a fourth technique of the disclosure, in planar mode, for different prediction sample locations, different reference samples may be used to generate the prediction samples. In one example, video encoder 20 and video decoder 30 may generate the top-left prediction sample, using the reference sample TL, above reference sample $r_{x,-1}$, and the left reference sample $r_{-1,y}$. Video encoder 20 and video decoder 30 may generate the bottom right prediction sample generated using reference sample TR and BL.

Figure 9B:
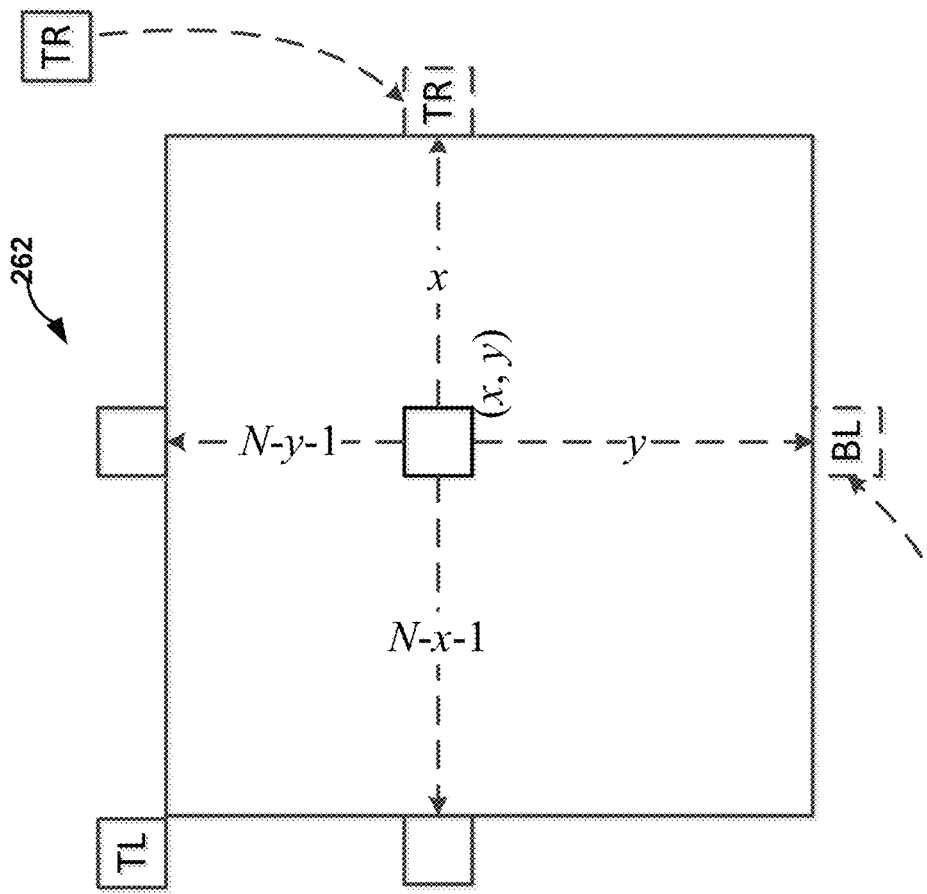
FIG. 9B illustrates an example of a planar mode, in accordance with one or more techniques of this disclosure.
Figure 9A:
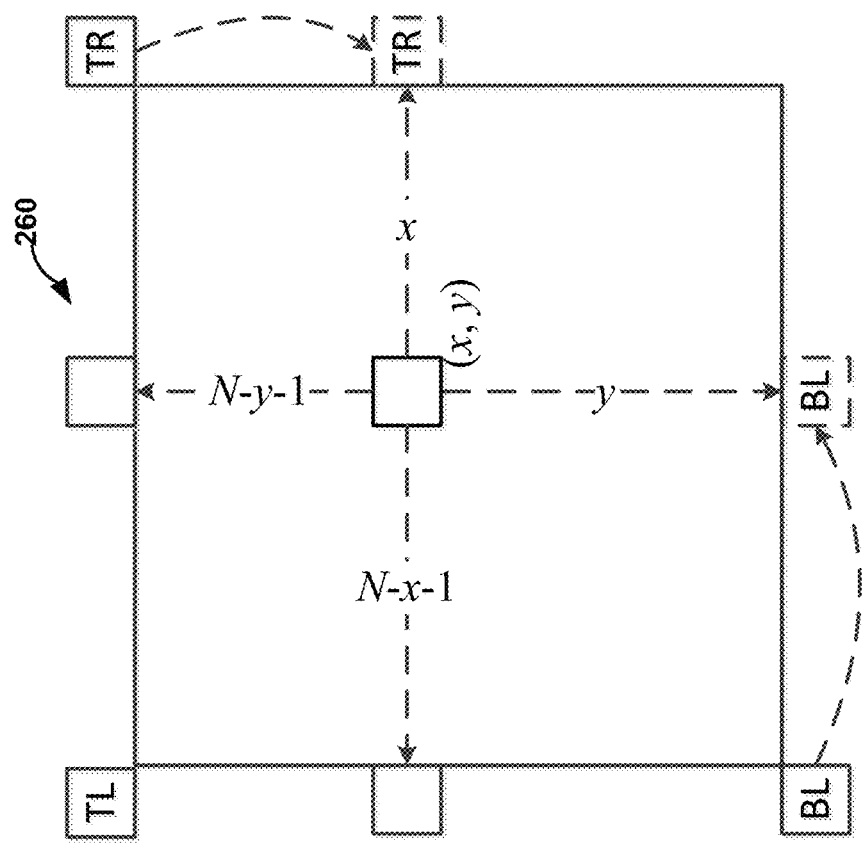
FIG. 9A illustrates an example of a planar mode, in accordance with one or more techniques of this disclosure.

In some examples, the top-right reference sample TR and bottom-left reference sample BL may be shifted by a predefined value, which may be decided based on the block size, width/height and prediction sample location, as shown below in changes from FIG. 9A to FIG. 9B. That is, the bottom-left reference sample and top-right sample of block 260 in FIG. 9A may be shifted to the positions shown relative to block 262 in FIG. 9B. In some examples, the planar mode uses a 5-tap filter using the TL, TR, BL, above and left reference samples.

In accordance with a fifth technique of the disclosure, video encoder 20 and video decoder 30 may be configured to derive the planar mode prediction filters applied on a block having a first particular block size using the planar prediction filter applied on different block having a different block size. In one example, the planar prediction filters applied on a 4×8 block is derived using the planar prediction filter applied on a 16×16 or a 16×8 block. Video encoder 20 and video decoder 30 may be configured to derive the prediction filter coefficients on a given location of a 4×8 block using the prediction filter applied on the corresponding downsampled/upsampled location in the given 16×16 or 16×8 block.

In accordance with a sixth technique of the disclosure, video encoder 20 and video decoder 30 may be configured to determine a context to entropy code any of the syntax elements discussed above (e.g., a flag or index) based on the number of non-zero transform coefficients in a block of video data. For example, one context may be used for a number of non-zero transform coefficients being in one range (e.g., between 3 and 5 non-zero coefficients inclusive), another context can be assigned for another range of the number of non-zero transform coefficients, and so on. The number of ranges can be fixed or adaptive. For example, the number of ranges may be dependent on the block size or block shape. Additionally, the range of the number of non-zero transform coefficients can be dependent on the block size and/or block shape (e.g., rectangular, square and etc.). For example, this context modeling can be used to signal sample smoothing tools, for example ARSS (adaptive reference sample smoothing), PDPC, MDIS or other filtering or smoothing methods.

The following are examples of possible specifications for implementing one or more techniques of this disclosure.

Process of Deriving the Look-Up Table for Bilateral Filter Weightings

Output are the two look-up tables to be derived. The below process may be invoked only once before encoding/decoding, or the look-up tables are pre-calculated and stored in external ROM (Read-Only Memory) and loaded only once before encoding/decoding.

```
MAX_CU_SIZE_LOG2 = 7;
BIRS_SCALE = 256;
const Double bilateralSigma0[MAX_CU_SIZE_LOG2] = { 2.4,
2.4, 2.4, 2.4, 2.4, 2.4, 2.4 };
for (i = 0; i < MAX_CU_SIZE_LOG2; i++)
{
    Double s0 = bilateralSigma0[i];
    for (c = 0; c < 2; c++ )
    {
        Int temp = (Double)BIRS_SCALE*exp(-
        ((Double)c+1.0)*((Double)c+1.0)/s0)+0.5;
        lutSigma0[i][c] = temp;
    }
}
// Intensity
const Double bilateralSigma1[MAX_CU_SIZE_LOG2] = { 260,
260, 260, 260, 260, 260, 260 };
for (i = 0; i < MAX_CU_SIZE_LOG2; i++)
{
    Double s1 = bilateralSigma1[i];
    for (c = 0; c < 256; c++ )
    {
        Int temp =
        (Double)BIRS_SCALE*exp(-(Double)(c*c)/s1)+0.5;
        lutSigma1[i][255+c] = temp;
        lutSigma1[i][255-c] = temp;
    }
}
```

With the above processing, two look-up tables lutSigma0 and lutSigma1 are derived.

Process of Performing Bilateral Intra Reference Filtering

Input include the reference sample to be filtered, i.e., p2, and its neighboring reference samples p0, p1, p3 and p4, which are located at −2, −1, +1, +2 positions, respectively. The bit-depth of image sample (bitDepth), the block width W and height H, the look-up tables lutSigma0 and lutSigma1 derived based on Embodiment #4.1.

Output is the filtered reference sample value.

Figure 10:
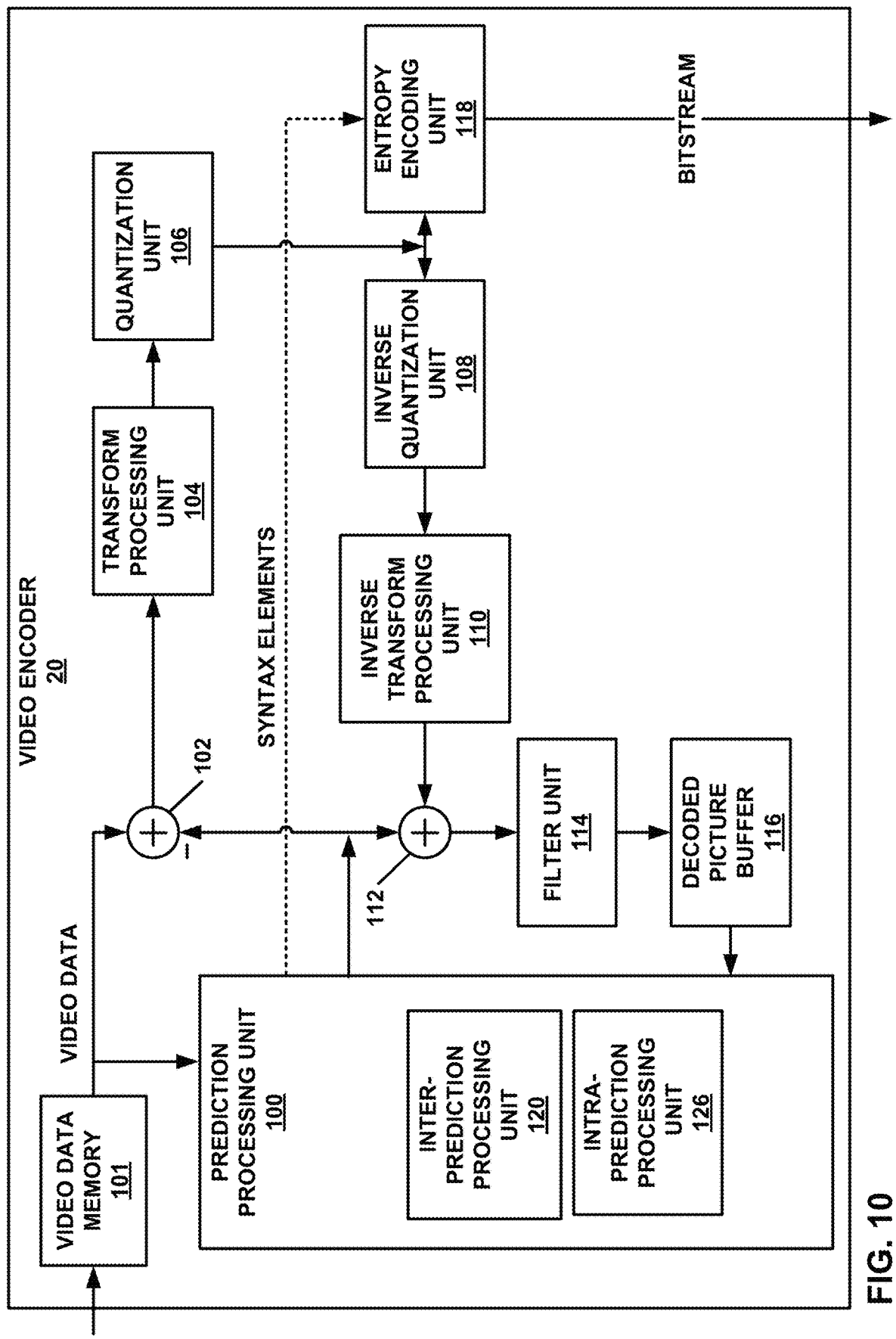
FIG. 10 is a block diagram illustrating an example video encoder that may implement one or more techniques described in this disclosure.

```
const Int  sizeIndex   = (( log(W) + log(H) ) >> 1 ) − 1;
const Int  shiftBitDepth = bitDepth−8;
const Int  *sigma0     = lutSigma0[sizeIndex];
const Int  *sigma1     = lutSigma1[sizeIndex] + 255;
const Int w0 = sigma0[1] * sigma1[(p0−p2)>>shiftBitDepth];
const Int w1 = sigma0[0] * sigma1[(p1−p2)>>shiftBitDepth];
const Int w2 = BIRS_SIGMA0_SCALE*BIRS_SIGMA1_SCALE;
const Int w3 = sigma0[0] * sigma1[(p3−p2)>>shiftBitDepth];
const Int w4 = sigma0[1] * sigma1[(p4−p2)>>shiftBitDepth];
const Int output = ( ( w0*p0+w1*p1+w2*p2+w3*p3+w4*p4 ) /
(w0+w1+w2+w3+w4) );
``` return output;

FIG. 10 is a block diagram illustrating an example video encoder 20 that may implement the techniques of this disclosure. FIG. 10 is provided for purposes of explanation and should not be considered limiting of the techniques as broadly exemplified and described in this disclosure. The techniques of this disclosure may be applicable to various coding standards or methods.

Processing circuitry includes video encoder 20, and video encoder 20 is configured to perform one or more of the example techniques described in this disclosure. For instance, video encoder 20 includes integrated circuitry, and the various units illustrated in FIG. 10 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 10 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

In the example of FIG. 10, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be the same as or part of storage media 28 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU. As part of generating the predictive data for a PU, inter-prediction processing unit 120 performs inter prediction on the PU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Intra-prediction processing unit 126 may perform the techniques of this disclosure described above. Specific examples will be described in more detail below with reference to FIG. 12.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform partition the residual blocks of a CU into transform blocks of TUs of the CU. For instance, transform processing unit 104 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures.

In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents values of transform coefficients for a CU.

Figure 11:
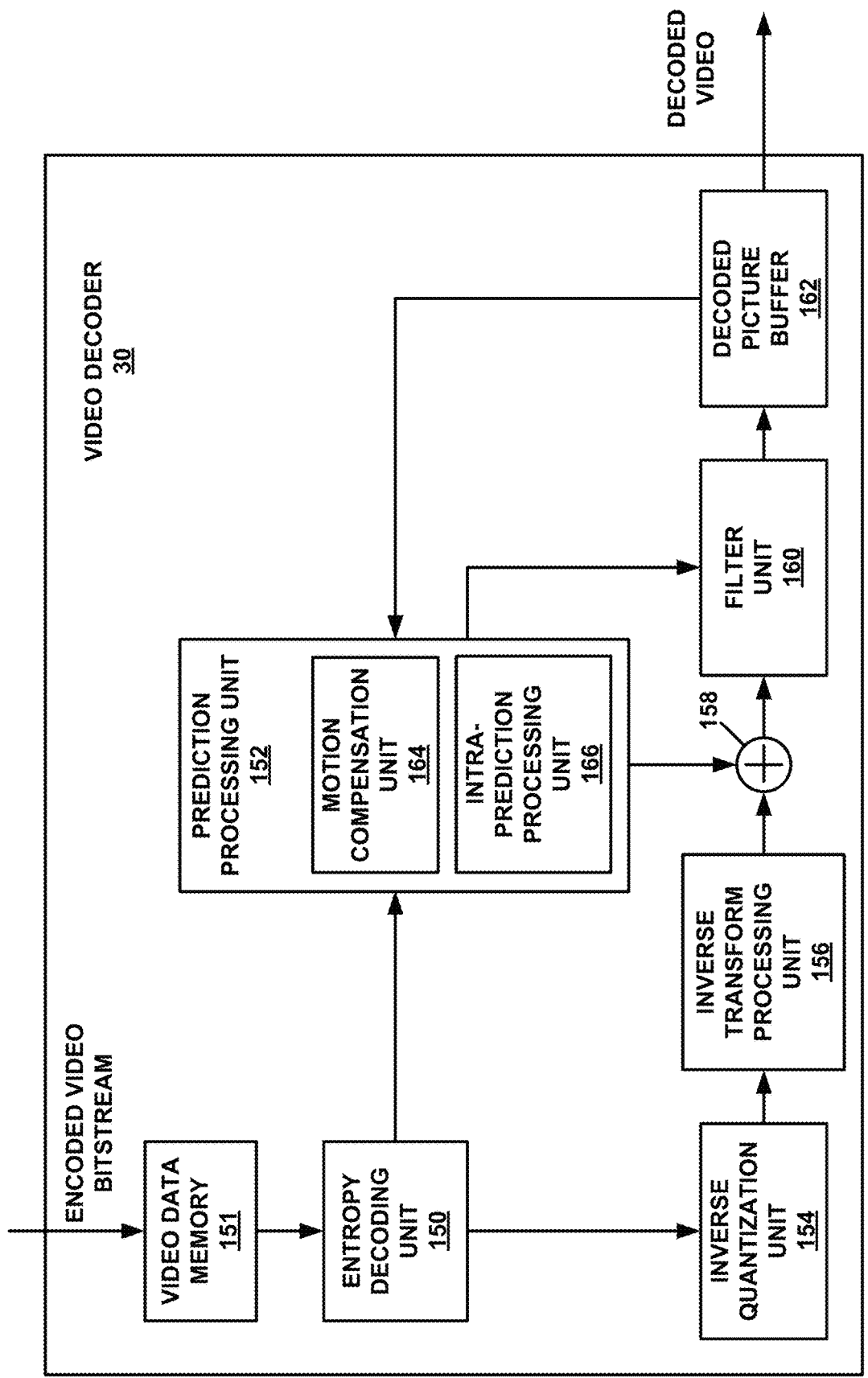
FIG. 11 is a block diagram illustrating an example video decoder that may implement one or more techniques described in this disclosure.

FIG. 11 is a block diagram illustrating an example video decoder 30 that is configured to implement the techniques of this disclosure. FIG. 11 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Processing circuitry includes video decoder 30, and video decoder 30 is configured to perform one or more of the example techniques described in this disclosure. For instance, video decoder 30 includes integrated circuitry, and the various units illustrated in FIG. 11 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 11 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 11, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream. Intra-prediction processing unit 166 may perform the techniques of this disclosure described above. Specific examples will be described in more detail below with reference to FIG. 13.

If a PU is encoded using inter prediction, motion compensation unit 164 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Figure 12:
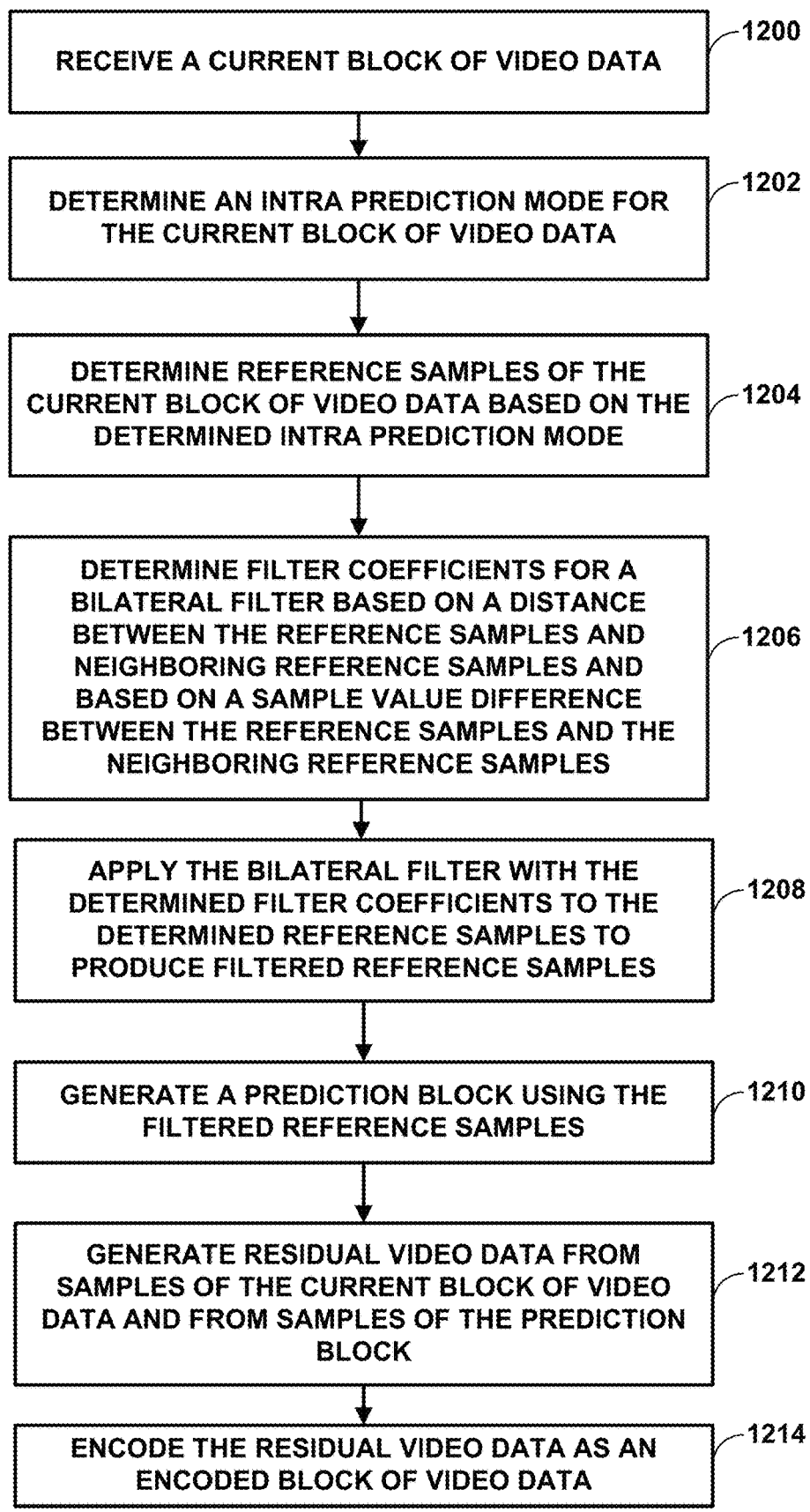
FIG. 12 is a flowchart illustrating an example video encoding technique of the disclosure.

FIG. 12 is a flowchart illustrating an example video encoding technique of the disclosure. The techniques of FIG. 12 may be performed by one or more structural components of video encoder 20, including intra-prediction processing unit 126.

In one example of the disclosure, video encoder 20 may be configured to receive a current block of video data (1200), and determine an intra prediction mode for the current block of video data (1202). Video encoder 20 may further determine reference samples of the current block of video data based on the determined intra prediction mode (1204), and determine filter coefficients for a bilateral filter based on a distance between the reference samples and neighboring reference samples and based on a sample value difference between the reference samples and the neighboring reference samples (1206). Video encoder 20 may apply the bilateral filter with the determined filter coefficients to the determined reference samples to produce filtered reference samples (1208), and generate a prediction block using the filtered reference samples (1210). The prediction block may include prediction values that respectively correspond to each of the samples of the current block. Video encoder 20 may generate residual video data from samples of the current block of video data and from samples of the prediction block (1212). For example, video encoder 20 may be configured to generate residual video data by subtracting samples of the current block from corresponding samples of the prediction block. Video encoder 20 may further encode the residual video data as an encoded block of video data (1214).

In one example of the disclosure, the bilateral filter is a 5-tap bilateral filter. In another example of the disclosure, video encoder 20 may be configured to determine the filter coefficients using the equation:

$$f_i = a^{-\left(\frac{|i|^2}{\sigma_0} + \frac{|r_{x+i}-r_x|^2}{\sigma_1}\right)},$$

where $f_i$ is a filter coefficient at position i, $r_x$ is a value of a reference sample to be filtered, rx+i is a value of a neighboring reference sample i samples from the reference sample to be filtered, i is the distance between the reference sample to be filtered and the neighboring reference sample corresponding to the filter coefficient $f_i$, a is a first filter parameter, $\sigma_0$ is a second filter parameter, and $\sigma_1$ is a third filter parameter.

In one example of the disclosure, a is equal to Napier's constant (2.71828). In another example, a is a power of 2. In another example, $\sigma_0$ is equal to 2.4 and $\sigma_1$ is equal to 260.

In another example of the disclosure, video encoder 20 is further configured to generate syntax elements that indicate the values of one or more of the first filter parameter, the second filter parameter, or the third filter parameter in one or more of a video parameter set (VPS), sequence parameter set (SPS), picture parameter set (SPS), or slice header.

In another example of the disclosure, video encoder 20 is further configured to determine an output of the bilateral filter applied to the determined reference samples from a look-up table.

Figure 13:
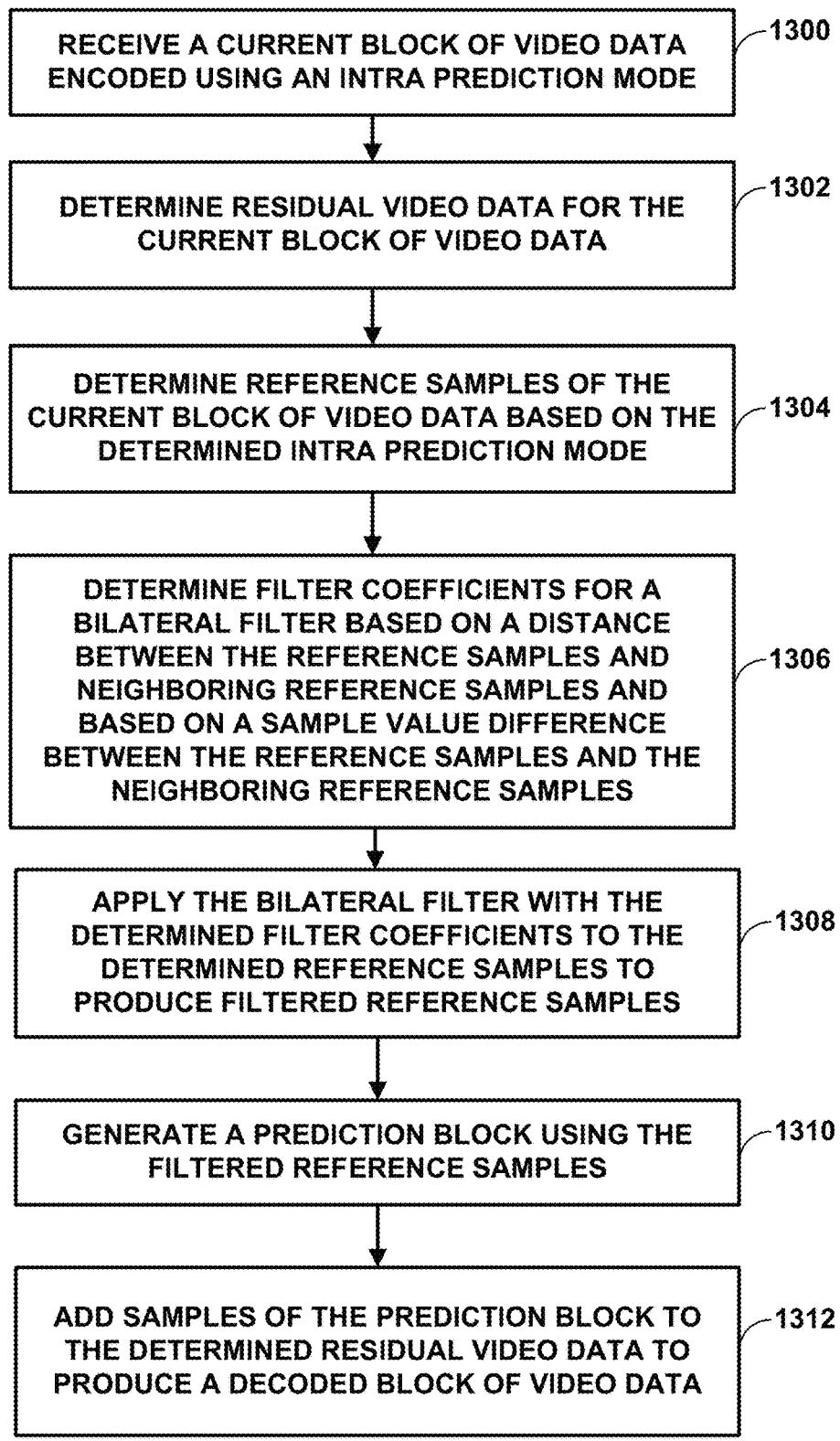
FIG. 13 is a flowchart illustrating an example video decoding technique of the disclosure.

FIG. 13 is a flowchart illustrating an example video decoding technique of the disclosure. The techniques of FIG. 13 may be performed by one or more structural components of video decoder 30, including intra-prediction processing unit 166.

In one example of the disclosure, video decoder 30 may be configured to receive A current block of video data encoded using an intra prediction mode (1300), and determine residual video data for the current block of video data (1302). Video decoder 30 may further determine reference samples of the current block of video data based on the intra prediction mode (1304), and determine filter coefficients for a bilateral filter based on a distance between the reference samples and neighboring reference samples and based on a sample value difference between the reference samples and the neighboring reference samples (1306). Video decoder 30 may apply the bilateral filter with the determined filter coefficients to the determined reference samples to produce filtered reference samples (1308), and generate a prediction block using the filtered reference samples (1310). The prediction block may include prediction values that respectively correspond to each of the samples of the current block. Video decoder 30 may further add samples of the prediction block to the determined residual video data to produce a decoded block of video data (1312).

In one example of the disclosure, the bilateral filter is a 5-tap bilateral filter. In another example of the disclosure, video decoder 30 may be configured to determine the filter coefficients using the equation:

$$f_i = a^{-\left(\frac{|i|^2}{\sigma_0} + \frac{|r_{x+i}-r_x|^2}{\sigma_1}\right)},$$

where $f_i$ is a filter coefficient at position i, $r_x$ is a value of a reference sample to be filtered, rx+i is a value of a neighboring reference sample i samples from the reference sample to be filtered, i is the distance between the reference sample to be filtered and the neighboring reference sample corresponding to the filter coefficient $f_i$, a is a first filter parameter, $\sigma_0$ is a second filter parameter, and $\sigma_1$ is a third filter parameter.

In one example of the disclosure, a is equal to Napier's constant (2.71828). In another example, a is a power of 2. In another example, $\sigma_0$ is equal to 2.4 and $\sigma_1$ is equal to 260.

In another example of the disclosure, video decoder 30 is further configured to receive syntax elements that indicate the values of one or more of the first filter parameter, the second filter parameter, or the third filter parameter in one or more of a video parameter set (VPS), sequence parameter set (SPS), picture parameter set (SPS), or slice header.

In another example of the disclosure, video decoder 30 is further configured to determine an output of the bilateral filter applied to the determined reference samples from a look-up table.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
receiving a current block of video data encoded using an intra prediction mode;
determining residual video data for the current block of video data;
determining reference samples of the current block of video data;
determining filter coefficients for a bilateral filter based on a distance between the reference samples and neighboring reference samples and based on a sample value difference between the reference samples and the neighboring reference samples;
applying the bilateral filter with the determined filter coefficients to the determined reference samples to produce filtered reference samples;
generating a prediction block using the filtered reference samples; and
adding samples of the prediction block to the determined residual video data to produce a decoded block of video data.

2. The method of claim 1, wherein the bilateral filter is a 5-tap bilateral filter.

3. The method of claim 1, wherein determining the filter coefficients comprises determining the filter coefficients using the equation:

$$f_i = a^{-\left(\frac{|i|^2}{\sigma_0} + \frac{|r_{x+i} - r_x|^2}{\sigma_1}\right)},$$

where $f_i$ is a filter coefficient at position i, $r_x$ is a value of a reference sample to be filtered, rx+i s a value of a neighboring reference sample i samples from the reference sample to be filtered, i is the distance between the reference sample to be filtered and the neighboring reference sample corresponding to the filter coefficient $f_i$, a is a first filter parameter, $\sigma_0$ is a second filter parameter, and $\sigma_1$ is a third filter parameter.

4. The method of claim 3, wherein a is equal to Napier's constant (2.71828).

5. The method of claim 3, wherein a is a power of 2.

6. The method of claim 3, wherein $\sigma_0$ is equal to 2.4 and $\sigma_1$ is equal to 260.

7. The method of claim 3, the method further comprising:
receiving syntax elements that indicate the values of one or more of the first filter parameter, the second filter parameter, or the third filter parameter in one or more of a video parameter set (VPS), sequence parameter set (SPS), picture parameter set (SPS), or slice header.

8. The method of claim 1, wherein the intra prediction mode is a position-dependent prediction combination (PDPC) mode.

9. The method of claim 1, wherein applying the bilateral filter with the determined filter coefficients to the determined reference samples to produce filtered reference samples comprises:
determining an output of the bilateral filter applied to the determined reference samples from a look-up table.

10. The method of claim 1, further comprising:
displaying the decoded block of video data.

11. A method of encoding video data, the method comprising:
receiving a current block of video data;
determining an intra prediction mode for the current block of video data;
determining reference samples of the current block of video data based on the determined intra prediction mode;
determining filter coefficients for a bilateral filter based on a distance between the reference samples and neighboring reference samples and based on a sample value difference between the reference samples and the neighboring reference samples;
applying the bilateral filter with the determined filter coefficients to the determined reference samples to produce filtered reference samples;
generating a prediction block using the filtered reference samples;
generating residual video data from samples of the current block of video data and from samples of the prediction block; and
encoding the residual video data as an encoded block of video data.

12. The method of claim 11, wherein the bilateral filter is a 5-tap bilateral filter.

13. The method of claim 11, wherein determining the filter coefficients comprises determining the filter coefficients using the equation:

$$f_i = a^{-\left(\frac{|i|^2}{\sigma_0} + \frac{|r_{x+i} - r_x|^2}{\sigma_1}\right)},$$

where $f_i$ is a filter coefficient at position i, $r_x$ is a value of a reference sample to be filtered, rx+i s a value of a neighboring reference sample i samples from the reference sample to be filtered, i is the distance between the reference sample to be filtered and the neighboring reference sample corresponding to the filter coefficient $f_i$, a is a first filter parameter, $\sigma_0$ is a second filter parameter, and $\sigma_1$ is a third filter parameter.

14. The method of claim 13, wherein a is equal to Napier's constant (2.71828).

15. The method of claim 13, wherein a is a power of 2.

16. The method of claim 13, wherein $\sigma_0$ is equal to 2.4 and $\sigma_1$ is equal to 260.

17. The method of claim 13, the method further comprising:
generating syntax elements that indicate the values of one or more of the first filter parameter, the second filter parameter, or the third filter parameter in one or more of a video parameter set (VPS), sequence parameter set (SPS), picture parameter set (SPS), or slice header.

18. The method of claim 11, wherein the intra prediction mode is a position-dependent prediction combination (PDPC) mode.

19. The method of claim 11, wherein applying the bilateral filter with the determined filter coefficients to the determined reference samples to produce filtered reference samples comprises:
determining an output of the bilateral filter applied to the determined reference samples from a look-up table.

20. The method of claim 11, further comprising:
outputting the encoded block of video data in an encoded video bitstream.

21. An apparatus configured to decode video data, the apparatus comprising:
a memory configured to store a current block of video data; and
one or more processors in communication with the memory, the one or more processors configured to:
receive the current block of video data encoded using an intra prediction mode;
determine residual video data for the current block of video data;
determine reference samples of the current block of video data;
determine filter coefficients for a bilateral filter based on a distance between the reference samples and neighboring reference samples and based on a sample value difference between the reference samples and the neighboring reference samples;
apply the bilateral filter with the determined filter coefficients to the determined reference samples to produce filtered reference samples;
generate a prediction block using the filtered reference samples; and
add samples of the prediction block to the determined residual video data to produce a decoded block of video data.

22. The apparatus of claim 21, wherein the bilateral filter is a 5-tap bilateral filter.

23. The apparatus of claim 21, wherein to determine the filter coefficients, the one or more processors are further configured to determine the filter coefficients using the equation:

$$f_i = a^{-\left(\frac{|i|^2}{\sigma_0} + \frac{|r_{x+i} - r_x|^2}{\sigma_1}\right)},$$

where $f_i$ is a filter coefficient at position i, $r_x$ is a value of a reference sample to be filtered, rx+i s a value of a neighboring reference sample i samples from the reference sample to be filtered, i is the distance between the reference sample to be filtered and the neighboring reference sample corresponding to the filter coefficient $f_i$, a is a first filter parameter, $\sigma_0$ is a second filter parameter, and $\sigma_1$ is a third filter parameter.

24. The apparatus of claim 23, wherein a is equal to Napier's constant (2.71828).

25. The apparatus of claim 23, wherein a is a power of 2.

26. An apparatus configured to encode video data, the apparatus comprising:
a memory configured to store a current block of video data; and
one or more processors in communication with the memory, the one or more processors configured to:
receive the current block of video data;
determine an intra prediction mode for the current block of video data;
determine reference samples of the current block of video data based on the determined intra prediction mode;
determine filter coefficients for a bilateral filter based on a distance between the reference samples and neighboring reference samples and based on a sample value difference between the reference samples and the neighboring reference samples;
apply the bilateral filter with the determined filter coefficients to the determined reference samples to produce filtered reference samples;
generate a prediction block using the filtered reference samples;
generate residual video data from samples of the current block of video data and from samples of the prediction block; and
encode the residual video data as an encoded block of video data.

27. The apparatus of claim 26, wherein the bilateral filter is a 5-tap bilateral filter.

28. The apparatus of claim 26, wherein to determine the filter coefficients, the one or more processors are further configured to determine the filter coefficients using the equation:

$$f_i = a^{-\left(\frac{|i|^2}{\sigma_0} + \frac{|r_{x+i} - r_x|^2}{\sigma_1}\right)},$$

where $f_i$ is a filter coefficient at position i, $r_x$ is a value of a reference sample to be filtered, rx+i s a value of a neighboring reference sample i samples from the reference sample to be filtered, i is the distance between the reference sample to be filtered and the neighboring reference sample corresponding to the filter coefficient $f_i$, a is a first filter parameter, $\sigma_0$ is a second filter parameter, and $\sigma_1$ is a third filter parameter.

29. A non-transitory computer-readable storage medium storing instructions that, when executed, causes one or more processors of a device configured to decode video data to:
receive the current block of video data encoded using an intra prediction mode;
determine residual video data for the current block of video data;
determine reference samples of the current block of video data;
determine filter coefficients for a bilateral filter based on a distance between the reference samples and neighboring reference samples and based on a sample value difference between the reference samples and the neighboring reference samples;
apply the bilateral filter with the determined filter coefficients to the determined reference samples to produce filtered reference samples;
generating a prediction block using the filtered reference samples; and
add samples of the prediction block to the determined residual video data to produce a decoded block of video data.

30. A non-transitory computer-readable storage medium storing instructions that, when executed, causes one or more processors of a device configured to encode video data to:
receive the current block of video data;
determine an intra prediction mode for the current block of video data;
determine reference samples of the current block of video data based on the determined intra prediction mode;
determine filter coefficients for a bilateral filter based on a distance between the reference samples and neighboring reference samples and based on a sample value difference between the reference samples and the neighboring reference samples;

apply the bilateral filter with the determined filter coefficients to the determined reference samples to produce filtered reference samples;
generate a prediction block using the filtered reference samples;
generate residual video data from samples of the current block of video data and from samples of the prediction block; and
encode the residual video data as an encoded block of video data.

\* \* \* \* \*